US010763008B2

(12) United States Patent
Sasse et al.

(10) Patent No.: US 10,763,008 B2
(45) Date of Patent: *Sep. 1, 2020

(54) METHOD OF MANUFACTURING ELECTRICAL CABLE, AND RESULTING PRODUCT, WITH REDUCED REQUIRED INSTALLATION PULLING FORCE

(71) Applicant: Southwire Company, LLC, Carrollton, GA (US)

(72) Inventors: Philip Sasse, Douglasville, GA (US); Terry Chambers, Carrollton, GA (US); Randy D. Kummer, Villa Rica, GA (US); John Armstrong, Villa Rica, GA (US); David Reece, Calhoun, GA (US); Hai Lam, Douglasville, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,872

(22) Filed: Sep. 18, 2015

(65) Prior Publication Data

US 2016/0012945 A1  Jan. 14, 2016

Related U.S. Application Data

(63) Continuation of application No. 14/144,150, filed on Dec. 30, 2013, now Pat. No. 9,142,336, which is a
(Continued)

(51) Int. Cl.
*H01R 13/58* (2006.01)
*H01B 7/18* (2006.01)
(Continued)

(52) U.S. Cl.
CPC ............ *H01B 7/1875* (2013.01); *C08K 5/20* (2013.01); *C08K 5/54* (2013.01); *C08L 77/00* (2013.01);
(Continued)

(58) Field of Classification Search
CPC .... H01B 13/145; H01B 7/1875; H01B 3/443; H01B 13/24; H01B 3/22; H01B 3/465;
(Continued)

(56) References Cited

U.S. PATENT DOCUMENTS 2,276,437 A  3/1942 Vaala
2,685,707 A  8/1954 Llewellyn et al.
(Continued)

FOREIGN PATENT DOCUMENTS

AU  2006335277 A1  1/2008
BR  PI0609987 A2  11/2010
(Continued)

OTHER PUBLICATIONS

Supplementary European Search Report for EP 13767741.5 mailed Aug. 26, 2015 (6 pages).
(Continued)

*Primary Examiner* — Jean F Duverne
(74) *Attorney, Agent, or Firm* — Alston & Bird LLP

(57) ABSTRACT

Disclosed are cable types, including a type THHN cable, the cable types having a reduced surface coefficient of friction, and the method of manufacture thereof, in which the central conductor core and insulating layer are surrounded by a material containing nylon or thermosetting resin. A silicone based pulling lubricant for said cable, or alternatively, erucamide or stearyl erucamide for small cable gauge wire, is incorporated, by alternate methods, with the resin material from which the outer sheath is extruded, and is effective to reduce the required pulling force between the formed cable and a conduit during installation.

25 Claims, 6 Drawing Sheets

Related U.S. Application Data continuation of application No. 13/774,677, filed on Feb. 22, 2013, now Pat. No. 8,616,918, which is a continuation of application No. 13/274,052, filed on Oct. 14, 2011, now Pat. No. 8,382,518, which is a continuation of application No. 12/787,877, filed on May 26, 2010, now Pat. No. 8,043,119, which is a continuation of application No. 11/675,441, filed on Feb. 15, 2007, now Pat. No. 7,749,024, which is a continuation-in-part of application No. 11/120,487, filed on May 3, 2005, now abandoned, which is a continuation-in-part of application No. 10/952,294, filed on Sep. 28, 2004, now Pat. No. 7,411,129, said application No. 11/675,441 is a continuation-in-part of application No. 10/952,294.

(51) Int. Cl.

| | | |
|---|---|---|
| *H01B 13/24* | (2006.01) | |
| *H01B 3/22* | (2006.01) | |
| *H01B 3/46* | (2006.01) | |
| *H01B 3/44* | (2006.01) | |
| *H01B 13/14* | (2006.01) | |
| *C08L 77/00* | (2006.01) | |
| *C08K 5/54* | (2006.01) | |
| *C08K 5/20* | (2006.01) | |
| *H01B 7/02* | (2006.01) | |
| *H01B 7/00* | (2006.01) | |
| *H01B 7/29* | (2006.01) | |
| *H02G 3/04* | (2006.01) | |
| *C08G 77/04* | (2006.01) | |

(52) U.S. Cl.
CPC .............. *H01B 3/22* (2013.01); *H01B 3/443* (2013.01); *H01B 3/445* (2013.01); *H01B 3/465* (2013.01); *H01B 7/0009* (2013.01); *H01B 7/02* (2013.01); *H01B 7/0216* (2013.01); *H01B 7/292* (2013.01); *H01B 13/145* (2013.01); *H01B 13/24* (2013.01); *H02G 3/0406* (2013.01); *C08G 77/04* (2013.01)

(58) Field of Classification Search
CPC ...... H01B 7/0216; H01B 3/445; C08G 77/04; C08L 77/00; C08K 5/54
USPC ........................................................ 439/604
See application file for complete search history.

(56) References Cited

U.S. PATENT DOCUMENTS

| | | | |
|---|---|---|---|
| 2,717,515 A * | 9/1955 | Pesante | G01K 3/08 374/43 |
| 2,851,515 A * | 9/1958 | Edward | H01B 7/18 174/117 R |
| 2,930,838 A | 3/1960 | Chizallet et al. | |
| 3,064,073 A | 11/1962 | Downing | |
| 3,106,981 A | 10/1963 | Chakiris | |
| 3,108,981 A | 10/1963 | Clark et al. | |
| 3,191,005 A | 6/1965 | Cox, 2nd | |
| 3,258,031 A | 6/1966 | French | |
| 3,333,037 A | 7/1967 | Humphrey et al. | |
| 3,378,628 A | 4/1968 | Garner | |
| 3,433,884 A | 3/1969 | Cogelia et al. | |
| 3,668,175 A | 6/1972 | Sattler | |
| 3,686,436 A | 8/1972 | Camras | |
| 3,727,704 A | 4/1973 | Abplanalp | |
| 3,747,428 A | 7/1973 | Waner et al. | |
| 3,849,221 A | 11/1974 | Middleton | |
| 3,852,875 A | 12/1974 | McAmis et al. | |
| 3,858,687 A | 1/1975 | Masarky et al. | |
| 3,868,436 A | 2/1975 | Ootsuji et al. | |
| 3,877,142 A | 4/1975 | Hamano et al. | |
| 3,885,286 A | 5/1975 | Hill | |
| 3,925,216 A | 12/1975 | Moorhouse | |
| 3,936,572 A | 2/1976 | MacKenzie, Jr. et al. | |
| 4,002,797 A | 1/1977 | Hacker et al. | |
| 4,022,285 A | 5/1977 | Frank | |
| 4,043,851 A | 8/1977 | Holladay et al. | |
| 4,057,956 A | 11/1977 | Tolle | |
| 4,099,425 A | 7/1978 | Moore | |
| 4,100,245 A | 7/1978 | Horikawa et al. | |
| 4,137,623 A | 2/1979 | Taylor | |
| 4,273,806 A | 6/1981 | Stechler | |
| 4,274,509 A | 6/1981 | Thomson et al. | |
| 4,275,096 A | 6/1981 | Taylor | |
| 4,299,256 A | 11/1981 | Bacehowski et al. | |
| 4,313,645 A | 2/1982 | Cocco | |
| 4,356,139 A | 10/1982 | Rowland et al. | |
| 4,360,492 A | 11/1982 | Rowland et al. | |
| 4,401,361 A | 8/1983 | Slaughter | |
| 4,416,380 A | 11/1983 | Flum | |
| 4,454,949 A | 6/1984 | Flum | |
| 4,522,733 A | 6/1985 | Jonnes | |
| 4,547,246 A | 10/1985 | Viriyayuthakorn et al. | |
| 4,568,420 A | 2/1986 | Nonni | |
| 4,569,420 A | 2/1986 | Pickett et al. | |
| 4,605,818 A | 8/1986 | Arroyo et al. | |
| 4,673,516 A | 6/1987 | Berry | |
| 4,684,214 A | 8/1987 | Goldmann et al. | |
| 4,693,936 A | 9/1987 | McGregor et al. | |
| 4,749,059 A | 6/1988 | Jonnes et al. | |
| 4,751,261 A | 6/1988 | Miyata et al. | |
| 4,761,445 A | 8/1988 | Chiba | |
| 4,770,902 A | 9/1988 | Barlow et al. | |
| 4,773,954 A | 9/1988 | Starnes, Jr. | |
| 4,806,425 A | 2/1989 | Chu-Ba | |
| 4,868,054 A | 9/1989 | Kartheiser | |
| 4,877,815 A | 10/1989 | Buckmaster et al. | |
| 4,895,221 A | 1/1990 | Carlson | |
| 4,910,359 A | 3/1990 | Dougherty et al. | |
| 4,937,142 A | 6/1990 | Ogushi et al. | |
| 4,940,504 A | 7/1990 | Starnes, Jr. | |
| 4,952,021 A | 8/1990 | Aoki et al. | |
| 4,965,249 A | 10/1990 | De With et al. | |
| 5,036,121 A | 7/1991 | Coaker et al. | |
| 5,055,522 A | 10/1991 | Ikeda et al. | |
| 5,074,640 A | 12/1991 | Hardin et al. | |
| 5,156,715 A | 10/1992 | Starnes, Jr. | |
| 5,199,511 A | 4/1993 | Tibbitts et al. | |
| 5,225,635 A | 7/1993 | Wake et al. | |
| 5,227,080 A | 7/1993 | Berry | |
| 5,252,676 A | 10/1993 | Suyama et al. | |
| 5,324,588 A | 6/1994 | Rinehart et al. | |
| 5,326,638 A | 7/1994 | Mottine, Jr. et al. | |
| 5,346,383 A | 9/1994 | Starnes, Jr. | |
| 5,356,710 A | 10/1994 | Rinehart | |
| 5,383,799 A | 1/1995 | Fladung | |
| 5,422,385 A | 6/1995 | Farkas | |
| 5,457,288 A * | 10/1995 | Olsson | H01B 7/183 174/105 R |
| 5,460,885 A | 10/1995 | Chu-Ba | |
| 5,492,760 A | 2/1996 | Sarma et al. | |
| 5,505,900 A | 4/1996 | Suwanda et al. | |
| 5,523,354 A | 6/1996 | Kaufmann et al. | |
| 5,561,730 A | 10/1996 | Lochkovic et al. | |
| 5,565,242 A | 10/1996 | Buttrick, Jr. et al. | |
| 5,614,288 A | 3/1997 | Bustos | |
| 5,614,482 A | 3/1997 | Baker et al. | |
| 5,656,371 A | 8/1997 | Kawahigashi et al. | |
| 5,660,932 A | 8/1997 | Durston | |
| 5,708,084 A | 1/1998 | Hauenstein et al. | |
| 5,733,823 A | 3/1998 | Sugioka et al. | |
| 5,741,858 A | 4/1998 | Brann et al. | |
| 5,753,861 A | 5/1998 | Hansen et al. | |
| 5,852,116 A | 12/1998 | Cree et al. | |
| 5,856,405 A | 1/1999 | Hofmann | |
| 5,886,072 A | 3/1999 | Linsky et al. | |
| 5,912,436 A | 6/1999 | Sanchez et al. | |
| 5,925,601 A | 7/1999 | McSherry et al. | |

(56) References Cited

U.S. PATENT DOCUMENTS

| | | |
|---|---|---|
| 6,019,628 A | 2/2000 | Shinchi |
| 6,057,018 A | 5/2000 | Schmidt |
| 6,064,073 A | 5/2000 | Hoogenraad |
| 6,080,489 A | 6/2000 | Mehta |
| 6,114,036 A | 9/2000 | Rinehart et al. |
| 6,137,058 A | 10/2000 | Moe et al. |
| 6,146,699 A | 11/2000 | Bonicel et al. |
| 6,159,617 A | 12/2000 | Foster et al. |
| 6,160,940 A | 12/2000 | Summers et al. |
| 6,179,665 B1 | 1/2001 | Rossman et al. |
| 6,188,026 B1 | 2/2001 | Cope et al. |
| 6,228,495 B1 | 5/2001 | Lupia et al. |
| 6,270,849 B1 | 8/2001 | Popoola et al. |
| 6,281,431 B1 | 8/2001 | Cumley |
| 6,327,841 B1 | 12/2001 | Bertini et al. |
| 6,347,561 B2 | 2/2002 | Uneme et al. |
| 6,392,155 B1 | 5/2002 | Shimizu et al. |
| 6,395,989 B2 | 5/2002 | Lecoeuvre et al. |
| 6,416,813 B1 | 7/2002 | Valls Prats et al. |
| 6,418,704 B2 | 7/2002 | Bertini et al. |
| 6,461,730 B1 | 10/2002 | Bachmann et al. |
| 6,474,057 B2 | 11/2002 | Bertini et al. |
| 6,485,325 B1 | 11/2002 | Fukuda |
| 6,534,717 B2 | 3/2003 | Suzuki et al. |
| 6,565,242 B2 | 5/2003 | Dai |
| 6,640,533 B2 | 11/2003 | Bertini et al. |
| 6,646,205 B2 | 11/2003 | Hase et al. |
| 6,810,188 B1 | 10/2004 | Suzuki et al. |
| 6,850,681 B2 | 2/2005 | Lepont et al. |
| 6,852,412 B2 | 2/2005 | Keogh |
| 6,864,420 B2 | 3/2005 | Li |
| 6,897,382 B2 | 5/2005 | Hager et al. |
| 6,903,264 B2 | 6/2005 | Watanabe et al. |
| 6,906,258 B2 | 6/2005 | Hirai et al. |
| 6,924,031 B2 | 8/2005 | Redondo et al. |
| 6,977,280 B2 | 12/2005 | Lee et al. |
| 7,053,308 B2 | 5/2006 | Prats et al. |
| 7,136,556 B2 | 11/2006 | Brown et al. |
| 7,144,952 B1 | 12/2006 | Court et al. |
| 7,411,129 B2 | 8/2008 | Kummer et al. |
| 7,447,406 B2 | 11/2008 | Sutehall et al. |
| 7,557,301 B2 | 7/2009 | Kummer et al. |
| 7,749,024 B2 | 7/2010 | Chambers et al. |
| 8,043,119 B2 | 10/2011 | Kummer et al. |
| 8,124,875 B2 | 2/2012 | Aitken et al. |
| 8,378,009 B2 | 2/2013 | Inagaki et al. |
| 8,382,518 B2 | 2/2013 | Chambers et al. |
| 8,525,031 B2 | 9/2013 | Hager et al. |
| 8,616,918 B2 | 12/2013 | Chambers et al. |
| 8,658,576 B1 | 2/2014 | Bigbee, Jr. et al. |
| 8,701,277 B2 | 4/2014 | Kummer et al. |
| 8,800,967 B2 | 8/2014 | Carlson et al. |
| 8,844,905 B2 | 9/2014 | Carlson et al. |
| 8,883,917 B1 | 11/2014 | Davies et al. |
| 8,912,253 B2 | 12/2014 | Montes et al. |
| 8,986,586 B2 | 3/2015 | Sasse et al. |
| 9,352,371 B1 | 5/2016 | Bigbee et al. |
| 9,412,495 B1 | 8/2016 | Bennett et al. |
| 9,431,152 B2 | 8/2016 | Sasse et al. |
| 9,587,201 B2 | 3/2017 | Tomsheck et al. |
| 9,922,756 B1 | 3/2018 | Smith et al. |
| 2002/0002221 A1 | 1/2002 | Lee |
| 2002/0010252 A1 | 1/2002 | Lecoeuvre et al. |
| 2002/0043391 A1 | 4/2002 | Suzuki et al. |
| 2003/0098176 A1 | 5/2003 | Mesaki et al. |
| 2003/0161596 A1 | 8/2003 | Register, III et al. |
| 2003/0195279 A1 | 10/2003 | Shah et al. |
| 2003/0234472 A1 | 12/2003 | Bolcar |
| 2004/0001682 A1 | 1/2004 | Beuth et al. |
| 2004/0007308 A1* | 1/2004 | Houston ............... C23F 11/149 156/54 |
| 2004/0198909 A1 | 10/2004 | Breitscheidel et al. |
| 2004/0254299 A1 | 12/2004 | Lee et al. |
| 2005/0019353 A1 | 1/2005 | Prinz et al. |
| 2005/0023029 A1 | 2/2005 | Mammeri et al. |
| 2005/0036753 A1 | 2/2005 | Will et al. |
| 2005/0180725 A1 | 8/2005 | Carlson et al. |
| 2006/0032661 A1* | 2/2006 | Gai .................. D07B 1/0693 174/128.1 |
| 2006/0065428 A1 | 3/2006 | Kummer et al. |
| 2006/0065430 A1 | 3/2006 | Kummer et al. |
| 2006/0068085 A1 | 3/2006 | Reece et al. |
| 2006/0068086 A1 | 3/2006 | Reece et al. |
| 2006/0088657 A1 | 4/2006 | Reece et al. |
| 2006/0151196 A1 | 7/2006 | Kummer et al. |
| 2006/0157303 A1 | 7/2006 | Reese et al. |
| 2006/0191621 A1 | 8/2006 | Kummer et al. |
| 2006/0249298 A1 | 11/2006 | Reece et al. |
| 2006/0249299 A1 | 11/2006 | Kummer et al. |
| 2006/0251802 A1 | 11/2006 | Kummer et al. |
| 2007/0098340 A1* | 5/2007 | Lee .................... G02B 6/4459 385/109 |
| 2007/0243761 A1 | 10/2007 | Chambers et al. |
| 2008/0066946 A1 | 3/2008 | Kummer et al. |
| 2008/0257599 A1 | 10/2008 | Matsushita et al. |
| 2008/0317990 A1 | 12/2008 | Runyan et al. |
| 2009/0233052 A1 | 9/2009 | Thuot et al. |
| 2010/0230134 A1 | 9/2010 | Chambers et al. |
| 2010/0236045 A1 | 9/2010 | Galindo et al. |
| 2010/0236811 A1 | 9/2010 | Sasse et al. |
| 2010/0326695 A1 | 12/2010 | Dion et al. |
| 2013/0153261 A1 | 6/2013 | Bremser et al. |
| 2013/0218325 A1 | 8/2013 | Carlson et al. |
| 2014/0053389 A1 | 2/2014 | Galindo et al. |
| 2014/0113069 A1 | 4/2014 | Kummer et al. |
| 2015/0014468 A1 | 1/2015 | Carlson et al. |
| 2015/0034891 A1 | 2/2015 | Carlson et al. |

FOREIGN PATENT DOCUMENTS

| | | |
|---|---|---|
| CA | 2614485 A1 | 2/2006 |
| CA | 2726607 A1 | 12/2009 |
| CA | 2755343 A | 9/2010 |
| CA | 2774428 A1 | 4/2011 |
| CN | 101223609 A | 7/2008 |
| CN | 202917210 U | 5/2013 |
| DE | 2528307 A1 | 1/1977 |
| DE | 4410456 A1 | 9/1995 |
| DO | P2011000290 A | 2/2012 |
| EA | 016504 B1 | 5/2012 |
| EG | 25128 A | 9/2011 |
| EP | 0283132 A2 | 9/1988 |
| EP | 0364717 A1 | 4/1990 |
| EP | 0544411 A1 | 6/1993 |
| EP | 1524294 A1 | 4/2005 |
| EP | 1899987 A2 | 3/2008 |
| EP | 1899988 A2 | 3/2008 |
| ES | 2402777 T3 | 5/2013 |
| FR | 2674364 A1 | 9/1992 |
| HK | 1113611 A1 | 5/2013 |
| IN | 9500996 | 3/2010 |
| JP | 59159708 A | 9/1984 |
| JP | 61076409 A | 4/1986 |
| JP | U1986076409 | 5/1986 |
| JP | S61-133506 A | 6/1986 |
| JP | S61-133507 A | 6/1986 |
| JP | 63094503 U | 6/1988 |
| JP | 63-216220 A | 9/1988 |
| JP | 01110013 A | 4/1989 |
| JP | 01144504 A | 6/1989 |
| JP | 01166410 A | 6/1989 |
| JP | 01307110 A | 12/1989 |
| JP | 05266720 A | 10/1993 |
| JP | 06057145 A | 3/1994 |
| JP | H07134913 A | 5/1995 |
| JP | 08-222041 A | 8/1996 |
| JP | 09045143 A | 2/1997 |
| JP | H09180558 A | 7/1997 |
| JP | 09251811 A | 9/1997 |
| JP | 10012051 A | 1/1998 |
| JP | 10086207 | 4/1998 |
| JP | 2000120922 A | 4/2000 |
| JP | 2001-026401 A | 1/2001 |
| JP | 2001-031903 A | 2/2001 |

(56) References Cited

FOREIGN PATENT DOCUMENTS

| | | | |
|---|---|---|---|
| JP | 2001052536 A | 2/2001 | |
| JP | 2001256836 A | 9/2001 | |
| JP | 2001264601 A | 9/2001 | |
| JP | 2002-128963 A | 5/2002 | |
| JP | 2002231065 A | 8/2002 | |
| JP | 2002-313153 A | 10/2002 | |
| JP | 2002324438 A | 11/2002 | |
| JP | 2003323820 A | 11/2003 | |
| JP | 2009-503765 A | 1/2009 | |
| JP | 2013-251270 A | 12/2013 | |
| KR | 2008041151 A | 5/2008 | |
| KR | 2013056283 A | 5/2013 | |
| MX | 2007014798 A | 5/2008 | |
| MX | 2011010044 A | 1/2012 | |
| NZ | 564551 A | 3/2011 | |
| SG | 161929 A1 | 6/2010 | |
| WO | WO-89/00763 | 1/1989 | |
| WO | WO-9108262 A2 | 6/1991 | |
| WO | WO-00/40653 A1 | 7/2000 | |
| WO | WO-01/81969 A1 | 11/2001 | |
| WO | WO-01/90230 A1 | 11/2001 | |
| WO | WO-2005042226 A1 | 5/2005 | |
| WO | WO 2006/016895 A1 | 2/2006 | |
| WO | WO 2006/016896 A1 | 2/2006 | |
| WO | WO-2006016896 A1 | 2/2006 | |
| WO | WO 2006/118702 A2 | 11/2006 | |
| WO | WO 2006/127711 A2 | 11/2006 | |
| WO | WO 2006/135467 A1 | 12/2006 | |
| WO | WO 2007/084745 A2 | 7/2007 | |
| WO | WO-2007/084745 A2 | 7/2007 | |
| WO | WO-2008/146921 A1 | 12/2008 | |
| WO | WO 2010/111167 A1 | 9/2010 | |
| WO | WO 2011/046998 A1 | 4/2011 | |
| ZA | 200711170 A | 8/2009 | |

OTHER PUBLICATIONS

Axel Plastics Research Laboratories, Inc., Product Data Sheet re "Mold Wiz, INT-33PA" (Approx. 2000) (1p).
Axel Plastics Research Laboratories, Inc., Product Data Sheet re "Mold Wiz, INT-40DHT" (Approx. 2001) (1p).
Axel Plastics Research Laboratories, Inc., Product Data Sheet re "Mold Wiz; INT-40GHT" (Approx. 2001) (1p).
Cerro Wire Ire, Inc.; Introductory Portion of Request for Inter Partes Reexamination Under 35 U.S.C. §§311-318 (Control No. 95/000,594); Nov. 17, 2010; pp. 1-37 (US).
Cerro Wire, Inc.; Exhibit W-1-W-38 (Claim Charts), Request for Inter Partes Reexamination Under 35 U.S.C. §§311-318 (Control No. 95/000,594); Nov. 17, 2010; pp. 1-1023 (US).
Cerro Wire, Inc.; Request for Ex Parte Reexamination Under 35 U.S.C. §§311-318 (USPTO); Oct. 1, 2009; 359 pages.
Cerro Wire, Inc.; Request for Inter Partes Reexamination Under 35 U.S.C. §§311-318 (USPTO); Sep. 26, 2008; pp. 1-90 (US).
Crompton Corporation brochure on Amides (approx. 2003) (27pp).
Crompton Corporation, Brochure entitled "Vinyl Additives Product Guide", (2002) (16pp).
Decoste. J. B.: "Friction of Vinyl Chloride Plastics," Bell Telephone Laboratories, Inc., Murray Hill, N.J., SPE Journal, Oct. 1969, vol. 25 (6 pages).
H. Domininghaus, "Les Matieres plastiques les plus usuelles," informations Chimie n° 158, p. 179-194 1976.
Dow Corning article "Siloxane additive minimizes friction in fibre optic cable conduit", 2001 (2pp) (http://www.dowcorning.com).
Dow Corning presentation entitled "MBs to Improve CoF—Injection Moulding & Extrusion"; from filed entitled "DC (rnultibase) Masterbatch training 2004.ppt": date uncertain; 8 pages (US).
Dow Corning Product Information sheet re Dow Corning MB25-504 composition, Jan. 2, 2002 (4pp) (http://www.dowcorning.com).
Dow Corning Product Information sheet re Dow Corning MB40-006 composition, Mar. 4, 2008 (1p) (http://www.dowcorning.com).

Dow Corning Product Information sheet re Dow Corning MB50-001 composition. Jan. 15, 2001 (6pp) (http://www.dowcorning.com).
Dow Corning Product Information sheet re Dow Corning MB50-002 composition, Jan. 15, 2001 (4pp) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Mar. 4, 2008 (1pp) (http://www.dowcorning.com).
Dow Corning Product Information sheet re Dow Corning MB50-010 composition, Jan. 16, 2001 (2pp) (http://www.dowcorning.com).
Dow Corning MB50-011 Masterbatch Product Information (4 pages), Ultra-high molecular weight siloxane polymer dispersed in polyimide 6, Jan. 15, 2001 (4pp).
Dow Corning, Dow Corning MB50-011 Masterbatch Product information, Ultra-high molecular weight siloxane polymer dispersed in nylon 6, 1999, pp. 1-5.
Dow Corning Product Information sheet re Dow Corning MB50-011 composition, Mar. 4, 2008 (1pp) (http://www.dowcorning.com).
Dow Corning Product Information sheet re Dow Corning MB50-320 composition, Mar. 4, 2008 (1p) (http://www.dowcorning.com).
Dow Corning Product Information sheet re Dow Corning MB50-321 composition, Jan. 15, 2001 (2pp) (http://www.dowcorning.com).
Dow Corning Product Information sheets re Dow Corning MB50-313 and MB50-314 composition, Jan. 15, 2001 (4pp) (http://www.dowcorning.com).
E.I. Du Pont De Nemours and Company, Flyer entitled "Teflon", (Aug. 14, 2003) (1p) (http://www.dupont.com).
Encore Wire Corporation; Request for Ex Parte Reexamination Statements Under 35 U.S.C. §§1.150(b)(1) and 1.150(b)(2) (USPTO); Nov. 17, 2009; 44 pages.
Encore Wire, Inc.; Introductory Portion of Corrected Request for Inter Partes Reexamination Under 35 U.S.C. §§1.193 (Control No. 95/000,573); Oct. 8, 2010; pp. 1-74 (US).
Encore Wire, Inc.; Exhibits 1-9 (Claim Charts) of Corrected Request for Inter Partes Reexamination Under 35 U.S.C. §§1.193 (Control No. 95/000,573); Oct. 8, 2010; pp. 1-137 (US).
Examination Report for New Zealand Application No. 564551, dated Aug. 14, 2009.
Extended European Search Report for European Application No. EP 06739714.1, dated Nov. 12, 2009.
General Electric Company, Brochure entitled "GE Silicones-Fluids, Emulsions & Specialties", (2001) (19pp).
Howard & Howard letter to Mr. Thomas C. Wright dated Feb. 7, 2008 regarding U.S. Appl. No. 11/675,441 (2pp) (US).
International Search Report and Written Opinion Mailed Aug. 21, 2006 from WO 2007/81372 (International App. No. PCT/US06/11069).
International Search Report Mailed May 17, 2010 from WO 2010/107932 (International App. No. PCT/US2010/027684).
International Search Report Mailed Oct. 20, 2006 from WO 2006/127711 (International App. No. PCT/US06/19923).
International Search Report Mailed Dec. 20, 2005 from WO 2006/16895 (International App. No. PCT/US05/05165).
Kaufman, et al., "A PVC jacket compound with improved flame retardancy and superior physical properties", Wire Technology, pp. 44-50, 7/8:75, (paper presented at the 23rd international Wire & Cable Symposium in Atlantic City, Dec. 1974), 7 pgs.
Kummer, R.D. et al., U.S. Appl. No. 11/120,487, filed May 3, 2005.
Kummer, R.D, et al., U.S. Appl. No. 11/135,986, filed May 24, 2005.
Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).
Opposition to European Patent EP 1899988 and accompanying documentation, filed with EPO on Oct. 22, 2013, received Oct. 29, 2013, (23 pgs).

(56) References Cited

OTHER PUBLICATIONS

Office Action for Co-Pending Patent Application No. 2008-513468 in Japan, Issued Jul. 22, 2014, 5 pgs.
Polywater® J specification, American Polywater Corporation, 4 pgs., Aug. 2010.
Ryan, et al., "Ultra-High-Molecular-Weight Functional Siloxane Additives in Polymers, Effects on Processing and Properties," Vinyl & Additive Technology, Mar. 2000, vol. 6, No. 1 (Mar. 2000), 13 pgs.
Southwire Company v. Cerro Wire, Inc.; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).
Southwire Company v. Cerro Wire, Inc.; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).
Southwire Company vs. Cerro Wire, Inc.; Court Order Granting Stay of Litigation pending USPTO's Reexamination of U.S. Pat. No. 7,411,129, Civil Action No. 3:08-CV-092-JTC; U.S.D.C.; Northern District of Georgia, Newnan Division, May 12, 2009, 13 pp. (US).
Southwire Company v. Cerro Wire, Inc.; Motion to Stay Pending Reexamination of the Patent-In-Suit; Civil Action No. 3:08-CV-092-JTC; U.S.D.C.; Northern District of Georgia; Newnan Division; Dec. 12, 2008; 11 pp (US).
Southwire Company v. Cerro Wire, Inc.; Defendant Cerro Wire, Inc.'s Response to Plaintiff's Motion to Dismiss Cerro's Invalidity Defenses Under 35 U.S.C. 102 and 103; Civil Action No. 3:08-CV-092-JTC; U.S.D.C.; Northern District of Georgia; Newnan Division; Jan. 16, 2009; 7 pp (US).
Southwire Company v. Cerro Wire, Inc.; Defendant Cerro Wire's Reply Memorandum in Support of its Motion to Stay Pending Reexamination of the Patent-In-Suit; Civil Action No. 3:08-CV-092-JTC; U.S.D.C.; Northern District of Georgia; Newnan Division; Jan. 16, 2009; 17 pp (US).
Southwire Company v. Cerro Wire, Inc.; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).
Southwire Company v. Cerro Wire, Inc.; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reexamination of the Patent-In-Suit; Civil Action No. 3:08-CV-092-JTC; U.S.D.C.: Northern District of Georgia; Newnan Division; Jan. 26, 2009; 16 pp (US).
Southwire Company v. Cerro Wire, Inc.; Southwire's Opposition to Defendant's Motion for Stay Pending Reexamination of the Patent-In-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).
Southwire Company; Response to Request for Inter Partes Reexamination (USPTO); Oct. 21, 2008; pp. 1-27 (US).
Southwire Company v. Encore Wire Corporation and Cerro Wire, Inc.; Southwire Company's Answer to Encore Wire Corporation's First Amended Answer, Affirmative Defenses, and Counterclaims, Civil Action No. 6:09-cv-289-LED; U.S.D.C. for the Eastern District of Texas, Tyler Division, Feb. 12, 2010, 17 pp. (US).
J.P. Trotignon, et al., "Extrusion des Thermoplastiques," In "Matieres Plastiques," Editons Nathan, 1996, p. 148.
UL Standard for Safety for Nonmetallic-Sheathed Cables, UL 719, Twelfth Edition, Feb. 9, 2006.
Thermoplastic-Insulated Wires and Cables, UL 83, In CSA Standards Update Service, Thirteenth Edition, Nov. 15, 2003, 186 pgs.
ultra-X TM, Une nouvelle dimension dans les cables NMD-7, ultra-X product brochure, Northern Telecom—Power Cable Division, Apr. 11, 1977, 28 pgs.

Underwriters Laboratories Inc. Standard for Safety UL-719 for Nonmetallic-Sheathed Cables, Eleventh Edition (Mar. 21, 2002), 46 pgs.
Translation of Submission of Oct. 22, 2013 from IPSILON to the EPO; RE: Opposition to European Patent EP 1899988, received Oct. 29, 2013, (21 pgs).
U.S. Appl. No. 60/544,224, filed Feb. 12, 2004, Carlson et al., 3 pp.
United States Patent and Trademark Office, Office Action in U.S. Appl. No. 11/120,487, Nov. 2, 2005 (5pp).
United States Patent and Trademark Office, Office Action in U.S. Appl. No. 11/120,487, Jun. 8, 2006 (13pp).
United States Patent and Trademark Office, Office Action in U.S. Appl. No. 11/135,807, Dec. 15, 2005 (9pp).
United States Patent and Trademark Office, Office Action in U.S. Appl. No, 11/135,807, Jun. 8, 2006 (13pp).
United States Patent and Trademark Office, Office Action in U.S. Appl. No. 11/313,596, Mar. 20, 2007 (14pp).
United States Patent and Trademark Office, Office Action in U.S. Appl. No. 11/675,441, Dec. 28, 2007 (4pp).
United States Patent and Trademark Office, Office Action in U.S. Appl. No. 11/858,766, Feb. 9, 2009, 11 pp (US).
United States Patent and Trademark Office, Office Action in U.S. Appl. No. 11/858,766, Jun. 9, 2008, 8 pp (US).
United States Patent and Trademark Office: Office Action in Inter Partes Reexamination of U.S. Pat. No. 7,411,129 (Application/Control No. 95/000,403), Dec. 5, 2008, 26 pages (US).
United States Patent and Trademark Office; Office Action in Inter Partes Reexamination of U.S. Pat. No. 7,749,024 (Application/Control No. 95/000,573), Dec. 3, 2010, 12 pages (US).
United States Patent and Trademark Office; Office Action in it Partes Reexamination of U.S. Pat. No. 7,749,024 (Application/Control No. 95/000,594), Feb. 11, 2011, 25 pages (US).
United States Patent and Trademark Office, Office Action in U.S. Appl. No. 10/952,294, Aug. 7, 2007, 11 pp (US).
United States Patent and Trademark Office, Office Action in U.S. Appl. No. 10/952,294, Jul. 12, 2006, 13 pp (US).
United States Patent and Trademark Office, Office Action in U.S. Appl. No. 10/952,294, Mar. 14, 2007, 10 pp (US).
United States Patent and Trademark Office, Office Action in U.S. Appl. No. 10/952,294, Mar. 4, 2008, 6 pp (US).
United States Patent and Trademark Office; Office Action in U.S. Appl. No. 11/675,441; Oct. 6, 2008, 6 pages (US).
United States Patent and Trademark Office, Notice of Allowance in U.S. Appl. No. 12/017,222, Jan. 8, 2009 (11 pp).
United States Patent and Trademark Office, Notice of Allowance in U.S. Appl. No. 12/017,222, Feb. 27, 2009 (8 pp).
United States Patent and Trademark Office, Notice of Allowance in U.S. Appl. No. 12/017,222, Dec. 5, 2008 (12 pp).
United States Patent and Trademark Office, Office Action in U.S. Appl. No. 12/017,222, Aug. 7, 2008, 8 pp.
United States Patent and Trademark Office; Response to Office Action in Inter Partes Reexamination of U.S. Pat. No. 7,749,024 (Application/Control No. 95/000,573), Feb. 3, 2011, 1-17.
United States Patent and Trademark Office; Response to Office Action in Inter Partes Reexamination of U.S. Pat. No. 7,749,024 (Application/Control No. 95/000,594), Apr. 11, 2011, 1-35 pages (US).
United States Patent and Trademark Office; Response to Office Action in Inter Partes Reexamination of U.S. Pat. No. 7,749,024 (Application/Control No. 95/000,594), Filed Sep. 10, 2012, 67 pages (US).
United States Patent and Trademark Office; Right of Appeal Notice in Inter Partes Reexamination of U.S. Pat. No. 7,749,024 (Application/Control No. 95/000,573), Sep. 28, 2012, 53 pages (US).
United States Patent and Trademark Office; Right of Appeal Notice in Inter Partes Reexamination of U.S. Pat. No. 7,749,024 (Application/Control No. 95/000,594), Oct. 25, 2012, 162 pages (US).
United States Patent and Trademark Office; Response to Action Closing Proceeding in Inter Partes Reexamination of U.S. Pat. No. 7,749,024 (Application/Control No. 95/000,573), Filed Aug. 15, 2012, 27 pages (US).

(56) References Cited

OTHER PUBLICATIONS

Wild, Frank: "The Effects of Silicone Polymer Additions on the Processing and Properties of an Isotactic Propylene Homopolymer," Sep. 1995 (102 pages).
Wiles, John, "Clarifying Confusing Cables," Home Power #66, Aug./Sep. 1998.
WITCO Corporation, Brochure entitled "Fatty Acids, Glycerine, Triglycerides", (1997) (22pp).
Yellow 77® document, Ideal Industries GmbH, 1 pg., 2003.
Declaration of William N. Unertl, PhD, Reexamination 95/000,573, Exhibit 2, Feb. 25, 2011, 27 pages.
Southwire, "Romex® SIMpull® Type NM-B", Product Specifications, retrieved from <http://www.southwire.com/products/RomexSIMpullTypeNMBOEM.htm> on Mar. 12, 2015.
Southwire Company, Response to Office Action for U.S. Appl. No. 10/952,294, Dec. 12, 2006, 14 pages, U.S.
Southwire Company, Response to Office Action for U.S. Appl. No. 10/952,294, May 14, 2007, 20 pages, U.S.
United States Patent and Trademark Office, Office Action for U.S. Appl. No. 10/952,294, May 30, 2007, 8 pages, U.S.
Southwire Company, Response to Office Action for U.S. Appl. No. 10/952,294, Jul. 11, 2007, 27 pages, U.S.
Southwire Company, Response to Office Action for U.S. Appl. No. 10/952,294, Aug. 9, 2007, 19 pages, U.S.
Southwire Company, Response to Office Action for U.S. Appl. No. 10/952,294, Sep. 14, 2007, 7 pages, U.S.
United States Patent and Trademark Office, Notice of Allowance for U.S. Appl. No. 10/952,294, Oct. 12, 2007, 8 pages, U.S.
United States Patent and Trademark Office, Notice of Allowance for U.S. Appl. No. 10/952,294, Dec. 31, 2007, 9 pages, U.S.
Southwire Company, Response to Office Action for U.S. Appl. No. 10/952,294, Feb. 15, 2008, 9 pages, U.S.
United States Patent and Trademark Office, Notice of Allowance for U.S. Appl. No. 10/952,294, Mar. 25, 2008, 12 pages, U.S.
United States Patent and Trademark Office, Notice of Allowance for U.S. Appl. No. 10/952,294, Apr. 30, 2008, 11 pages, U.S.
United States Patent and Trademark Office, Notice of Allowance for U.S. Appl. No. 10/952,294, Jun. 27, 2008, 9 pages, U.S.
Southwire Company, Response to Office Action for U.S. Appl. No. 11/120,487, Dec. 9, 2005, 8 pages, U.S.
United States Patent and Trademark Office, Office Action for U.S. Appl. No. 11/120,487, Jan. 5, 2006, 10 pages, U.S.
Southwire Company, Response to Office Action for U.S. Appl. No. 11/120,487, Apr. 28, 2006, 16 pages, U.S.
Southwire Company, Response to Office Action for U.S. Appl. No. 11/135,807, Apr. 27, 2006, 14 pages, U.S.
United States Patent and Trademark Office, Office Action for U.S. Appl. No. 11/135,986, Jul. 12, 2006, 10 pages, U.S.
Southwire Company, Response to Office Action for U.S. Appl. No. 11/135,986, Jan. 12, 2007, 14 pages, U.S.
United States Patent and Trademark Office, Office Action for U.S. Appl. No. 11/135,986, Mar. 14, 2007, 11 pages, U.S.
United States Patent and Trademark Office, Office Action for U.S. Appl. No. 11/410,820, Jun. 11, 2009, 10 pages, U.S.
Southwire Company, Response to Office Action for U.S. Appl. No. 11/675,441, Jun. 30, 2008, 47 pages, U.S.
Southwire Company, Response to Office Action for U.S. Appl. No. 11/675,441, Apr. 6, 2009, 15 pages, U.S.
United States Patent and Trademark Office, Office Action for U.S. Appl. No. 11/675,441, Jun. 25, 2009, 11 pages, U.S.
Southwire Company, Response to Office Action for U.S. Appl. No. 11/675,441, Sep. 4, 2009, 12 pages, U.S.
United States Patent and Trademark Office, Office Action for U.S. Appl. No. 11/675,441, Dec. 9, 2009, 6 pages, U.S.
Southwire Company, Response to Office Action for U.S. Appl. No. 11/675,441, Mar. 24, 2010, 18 pages, U.S.
United States Patent and Trademark Office, Notice of Allowance for U.S. Appl. No. 11/675,441, Apr. 6, 2010, 10 pages, U.S.
Southwire Company, Response to Office Action for U.S. Appl. No. 11/858,766, Dec. 9, 2008, 13 pages, U.S.

Southwire Company, Response to Office Action for U.S. Appl. No. 12/017,222, Oct. 21, 2008, 26 pages, U.S.
Southwire Company, Reply in U.S. Appl. No. 12/017,222, Dec. 8, 2008, 17 pages, U.S.
Southwire Company, Reply in for U.S. Appl. No. 12/017,222, Dec. 12, 2008, 12 pages, U.S.
United States Patent and Trademark Office, Office Action for U.S. Appl. No. 12/497,586, Jul. 7, 2011, 6 pages, U.S.
Southwire Company, Response to Office Action for U.S. Appl. No. 12/497,586, Jan. 9, 2012, 21 pages, U.S.
United States Patent and Trademark Office, Office Action for U.S. Appl. No. 12/497,586, Mar. 30, 2012, 20 pages, U.S.
Southwire Company, Response to Office Action for U.S. Appl. No. 12/497,586, May 30, 2012, 15 pages, U.S.
United States Patent and Trademark Office, Notice of Allowance for U.S. Appl. No. 12/497,586, Aug. 8, 2012, 24 pages, U.S.
Southwire Company, Response to Notice of Allowance for U.S. Appl. No. 12/497,586, Nov. 8, 2012, 9 pages, U.S.
Southwire Company, Response to Notice to File Corrected Papers for U.S. Appl. No. 12/497,586, Nov. 16, 2012, 12 pages, U.S.
United States Patent and Trademark Office, Notice of Allowance for U.S. Appl. No. 12/497,586, Nov. 18, 2013, 17 pages, U.S.
United States Patent and Trademark Office, Office Action for U.S. Appl. No. 12/787,877, Oct. 28, 2010, 13 pages, U.S.
Southwire Company, Response to Office Action for U.S. Appl. No. 12/787,877, Apr. 28, 2011, 44 pages, U.S.
United States Patent and Trademark Office, Notice of Allowance for U.S. Appl. No. 12/787,877, Aug. 3, 2011, 9 pages, U.S.
United States Patent and Trademark Office, Office Action for U.S. Appl. No. 13/274,052, Nov. 23, 2011, 8 pages, U.S.
Southwire Company, Response to Office Action for U.S. Appl. No. 13/274,052, May 23, 2012, 14 pages, U.S.
Southwire Company, Supplemental Response to Office Action for U.S. Appl. No. 13/274,052, Jul. 16, 2012, 37 pages, U.S.
United States Patent and Trademark Office, Notice of Allowance for U.S. Appl. No. 13/274,052, Aug. 17, 2012, 22 pages, U.S.
Southwire Company, Reply to Notice of Allowance for U.S. Appl. No. 13/274,052, Nov. 19, 2012, 23 pages, U.S.
United States Patent and Trademark Office, Notice of Allowance for U.S. Appl. No. 13/274,052, Dec. 12, 2012, 16 pages, U.S.
Southwire Company, Reply to Notice of Allowance for U.S. Appl. No. 13/274,052, Dec. 19, 2012, 5 pages, U.S.
United States Patent and Trademark Office, Supplemental Notice of Allowability for U.S. Appl. No. 13/274,052, Jan. 11, 2013, 3 pages, U.S.
United States Patent and Trademark Office, Notice of Allowance for U.S. Appl. No. 13/774,677, Apr. 30, 2013, 9 pages, U.S.
Southwire Company, Reply to Notice of Allowance for U.S. Appl. No. 13/774,677, Jul. 29, 2013, 24 pages, U.S.
United States Patent and Trademark Office, Notice of Allowance for U.S. Appl. No. 13/774,677, Aug. 21, 2013, 21 pages, U.S.
United States Patent and Trademark Office, Notice of Allowance for U.S. Appl. No. 14/144,150, Nov. 18, 2014, 24 pages, U.S.
Southwire Company, Reply to Notice of Allowance for U.S. Appl. No. 14/144,150, Feb. 17, 2015, 11 pages, U.S.
United States Patent and Trademark Office, Notice of Allowance for U.S. Appl. No. 14/144,150, May 22, 2015, 6 pages, U.S.
United States Patent and Trademark Office, Order Granting Ex Parte Examination of U.S. Pat. No. 7,557,301 (U.S. Appl. No. 90/009,589), Dec. 18, 2009, 20 pages, U.S.
Southwire Company, Response in Ex Parte Examination of U.S. Pat. No. 7,557,301 (U.S. Appl. No. 90/009,589), Jun. 4, 2010, 79 pages, U.S.
Southwire Company, Corrected Response in Ex Parte Examination of U.S Pat. No. 7,557,301 (U.S. Appl. No. 90/009,589), Jun. 7, 2010, 12 pages, U.S.
Southwire Company, Supplemental Response in Ex Parte Examination of U.S. Pat. No. 7,557,301 (U.S. Appl. No. 90/009,589), Jun. 11, 2010, 13 pages, U.S.
Southwire Company, Supplemental Response in Ex Parte Examination of U.S. Pat. No. 7,557,301 (U.S. Appl. No. 90/009,589), Sep. 22, 2010, 47 pages, U.S.

(56) References Cited

OTHER PUBLICATIONS

Encore Wire Corporation, Request for Ex Parte Examination of U.S. Pat. No. 7,557,301 (U.S. Appl. No. 90/009,592), Oct. 7, 2009, 161 pages, U.S.
United States Patent and Trademark Office, Order Granting Ex Parte Reexamination of U.S. Pat. No. 7,557,301 (U.S. Appl. No. 90/009,592), Feb. 5, 2010, 12 pages, U.S.
Southwire Company, Response in Ex Parte Reexamination of U.S. Pat. No. 7,557,301 (U.S. Appl. No. 90/009,592), Jul. 8, 2010, 6 pages, U.S.
Southwire Company, Response in Ex Parte Reexamination of U.S. Pat. No. 7,557,301 (U.S. Appl. No. 90/009,592), Oct. 25, 2010, 76 pages, U.S.
Southwire Company, Response in Ex Parte Reexamination of U.S. Pat. No. 7,557,301 (U.S. Appl. Nos. 90/009,589 and 90/009,592), Dec. 16, 2010, 10 pages, U.S.
Southwire Company, Response in Ex Parte Reexamination of U.S. Pat. No. 7,557,301 (U.S. Appl. Nos. 90/009,589 and 90/009,592), Aug. 10, 2011, 21 pages, U.S.
United States Patent and Trademark Office, Notice of Intent to Reissue in Ex Parte Reexamination of U.S. Pat. No. 7,557,301 (U.S. Appl. Nos. 90/009,589 and 90/009,592), Sep. 21, 2011, 8 pages, U.S.
Southwire Company, Response in Inter Partes Reexamination of U.S. Pat. No. 7,411,129 (U.S. Appl. No. 95/000,403), Feb. 5, 2009, 104 pages, U.S.
Cerro Wire Inc., Response in Inter Partes Reexamination of U.S. Pat. No. 7,411,129 (U.S. Appl. No. 95/000,403), Mar. 4, 2009, 44 pages, U.S.
United States Patent and Trademark Office, Right of Notice of Appeal in Inter Partes Reexamination of U.S. Pat. No. 7,411,129 (U.S. Appl. No. 95/000,403), Mar. 30, 2010, 23 pages, U.S.
Southwire Company, Response in Inter Partes Reexamination of U.S. Pat. No. 7,411,129 (U.S. Appl. No. 95/000,403), Apr. 29, 2010, 36 pages, U.S.
Southwire Company, Amended Response in Inter Partes Reexamination of U.S. Pat. No. 7,411,129 (U.S. Appl. No. 95/000,403), Apr. 30, 2010, 36 pages, U.S.
Cerro Wire Inc., Response in Inter Partes Reexamination of U.S. Pat. No. 7,411,129 (U.S. Appl. No. 95/000,403), May 14, 2010, 7 pages, U.S.
United States Patent and Trademark Office, Petition Decision in Inter Partes Reexamination of U.S. Pat. No. 7,411,129 (U.S. Appl. No. 95/000,403), May 27, 2010, 6 pages, U.S.
Cerro Wire Inc., Response in Inter Partes Reexamination of U.S. Pat. No. 7,411,129 (U.S. Appl. No. 95/000,403), Jun. 1, 2010, 9 pages, U.S.
Southwire Company, Response in Inter Partes Reexamination of U.S. Pat. No. 7,411,129 (U.S. Appl. No. 95/000,403), Jun. 30, 2010, 5 pages, U.S.
United States Patent and Trademark Office, Petition Decision in Inter Partes Reexamination of U.S. Pat. No. 7,411,129 (U.S. Appl. No. 95/000,403), Jul. 7, 2010, 6 pages, U.S.
Southwire Company, Response in Inter Partes Reexamination of U.S. Pat. No. 7,411,129 (U.S. Appl. Nos. 95/000,403), Jul. 31, 2010, 8 pages, U.S.
United States Patent and Trademark Office, Petition Decisions in Inter Partes Reexamination of U.S. Pat. No. 7,411,129 (U.S. Appl. No. 95/000,403), Aug. 10-11, 2010, 12 pages, U.S.
Southwire Company, Response in Inter Partes Reexamination of U.S. Pat. No. 7,411,129 (U.S. Appl. Nos. 95/000,403), Sep. 9, 2010, 8 pages, U.S.
Southwire Company, Patent Owner's Appeal Brief in Inter Partes Reexamination of U.S. Pat. No. 7,411,129 (U.S. Appl. Nos. 95/000,403), Sep. 13, 2010, 30 pages, U.S.
Cerro Wire Inc., Response in Inter Partes Reexamination of U.S. Pat. No. 7,411,129 (U.S. Appl. No. 95/000,403), Sep. 30, 2010, 12 pages, U.S.
Cerro Wire Inc., Respondent Brief in Inter Partes Reexamination of U.S. Pat. No. 7,411,129 (U.S. Appl. No. 95/000,403), Oct. 13, 2010, 30 pages, U.S.
United States Patent and Trademark Office, Petition Decisions in Inter Partes Reexamination of U.S. Pat. No. 7,411,129 (U.S. Appl. No. 95/000,403), Oct. 19 and 22, 2010, 17 pages, U.S.
Cerro Wire Inc., Rebuttal Brief in Inter Partes Reexamination of U.S. Pat. No. 7,411,129 (U.S. Appl. No. 95/000,403), Oct. 22, 2012, 18 pages, U.S.
United States Patent and Trademark Office, Patent Board Decision, Examiner Affirmed In-Part in Inter Partes Reexamination of U.S. Pat. No. 7,411,129 (U.S. Appl. No. 95/000,403), Jan. 31, 2014, 24 pages, U.S.
Southwire Company, Response to Decision on Appeal in Inter Partes Reexamination of U.S. Pat. No. 7,411,129 (U.S. Appl. Nos. 95/000,403), Feb. 28, 2014, 151 pages, U.S.
Cerro Wire Inc., Response to Decision on Appeal in Inter Partes Reexamination of U.S. Pat. No. 7,411,129 (U.S. Appl. No. 95/000,403), Mar. 28, 2014, 61 pages, U.S.
Encore Wire Corporation, Request for Inter Partes Reexamination of U.S. Pat. No. 7,749,024 (U.S. Appl. No. 95/000,573), Sep. 23, 2010, 92 pages, U.S.
United States Patent and Trade Mark Office, Order Granting Inter Partes Reexamination of U.S. Pat. No. 7,749,024 (U.S. Appl. No. 95/000,573), Nov. 9, 2010, 22 pages, U.S.
Encore Wire Corporation, Response in Inter Partes Reexamination of U.S. Pat. No. 7,749,024 (U.S. Appl. No. 95/000,573), Mar. 2, 2011, 51 pages, U.S.
United States Patent and Trade Mark Office, Action Closing Prosecution in Inter Partes Reexamination of U.S. Pat. No. 7,749,024 (U.S. Appl. No. 95/000,573), Jul. 9, 2012, 59 pages, U.S.
United States Patent and Trade Mark Office, Right of Appeal Notice in Inter Partes Reexamination of U.S. Pat. No. 7,749,024 (U.S. Appl. No. 95/000,573), Sep. 28, 2012, 58 pages, U.S.
Southwire Company, Response (Petition to Reopen and Request to Proposed Amendment) in Inter Partes Reexamination of U.S. Pat. No. 7,749,024 (U.S. Appl. No. 95/000,573), Oct. 17, 2012, 66 pages, U.S.
Southwire Company, Appeal Brief in Inter Partes Reexamination of U.S. Pat. No. 7,749,024 (U.S. Appl. No. 95/000,573), Dec. 31, 2012, 67 pages, U.S.
Encore Wire Corporation, Response Brief in Inter Partes Reexamination of U.S. Pat. No. 7,749,024 (U.S. Appl. No. 95/000,573), Jan. 25, 2013, 53 pages, U.S.
United States Patent and Trade Mark Office, Petition Decisions in Inter Partes Reexamination of U.S. Pat. No. 7,749,024 (U.S. Appl. No. 95/000,573), Apr. 4, 2013, Jun. 19, 2013, and Jun. 21, 2013, 25 pages, U.S.
United States Patent and Trade Mark Office, Examiner's Answer in Inter Partes Reexamination of U.S. Pat. No. 7,749,024 (U.S. Appl. No. 95/000,573), Jul. 16, 2013, 3 pages, U.S.
Southwire Company, Appellant's Rebuttal in Inter Partes Reexamination of U.S. Pat. No. 7,749,024 (U.S. Appl. No. 95/000,573), Aug. 16, 2013, 14 pages, U.S.
United States Patent and Trade Mark Office, Office Communication in Inter Partes Reexamination of U.S. Pat. No. 7,749,024 (U.S. Appl. No. 95/000,573), Sep. 4, 2013, 3 pages, U.S.
Encore Wire Corporation, Request for Rehearing in Inter Partes Reexamination of U.S. Pat. No. 7,749,024 (U.S. Appl. No. 95/000,573), Apr. 22, 2014, 7 pages, U.S.
Southwire Company, Patent Owner's Response to Request for Rehearing in Inter Partes Reexamination of U.S. Pat. No. 7,749,024 (U.S. Appl. No. 95/000,573), May 22, 2014, 5 pages, U.S.
United States Patent and Trade Mark Office, Board Decision, Reconsideration Denied in Part in Inter Partes Reexamination of U.S. Pat. No. 7,749,024 (U.S. Appl. No. 95/000,573), Nov. 3, 2014, 5 pages, U.S.
Encore Wire Corporation, Notice of Appeal to the U.S. Court of Appeals for the Federal Circuit in Inter Partes Reexamination of U.S. Pat. No. 7,749,024 (U.S. Appl. No. 95/000,573), Nov. 26, 2014, 9 pages, U.S.
Southwire Company, Notice of Election to Participate and Notice of Cross-Appeal to the U.S. Court of Appeals for the Federal Circuit

(56) References Cited

OTHER PUBLICATIONS in Inter Partes Reexamination of U.S. Pat. No. 7,749,024 (U.S. Appl. No. 95/000,573), Jan. 2, 2015, 14 pages, U.S.
Southwire Company, Response in Inter Partes Reexamination of U.S. Pat. No. 7,749,024 (U.S. Appl. No. 95/000,594), Apr. 11, 2011, 78 pages, U.S.
Southwire Company, Corrected Response in Inter Partes Reexamination of U.S. Pat. No. 7,749,024 (U.S. Appl. No. 95/000,594), Apr. 26, 2011, 85 pages, U.S.
Cerro Wire Inc., Response in Inter Partes Reexamination of U.S. Pat. No. 7,749,024 (U.S. Appl. No. 95/000,594), May 11, 2011, 69 pages, U.S.
United States Patent and Trademark Office, Action Closing Prosecution in Inter Partes Reexamination of U.S. Pat. No. 7,749,024 (U.S. Appl. No. 95/000,594), Aug. 10, 2012, 166 pages, U.S.
United States Patent and Trademark Office, Petition Decision—Dismissed in Inter Partes Reexamination of U.S. Pat. No. 7,749,024 (U.S. Appl. No. 95/000,594), Nov. 20, 2012, 7 pages, U.S.
Southwire Company, Notice of Appeal in Inter Partes Reexamination of U.S. Pat. No. 7,749,024 (U.S. Appl. No. 95/000,594), Nov. 26, 2012, 5 pages, U.S.
Southwire Company, Petition in Inter Partes Reexamination of U.S. Pat. No. 7,749,024 (U.S. Appl. No. 95/000,594), Jan. 28, 2013, 14 pages, U.S.
Southwire Company, Appeal Brief in Inter Partes Reexamination of U.S. Pat. No. 7,749,024 (U.S. Appl. No. 95/000,594), Jan. 28, 2013, 120 pages, U.S.
United States Patent and Trademark Office, Notice of Intent to Issue a Reexam Certificate in Inter Partes Reexamination of U.S. Pat. No. 7,749,024 (U.S. Appl. No. 95/000,594), Jul. 12, 2013, 14 pages, U.S.
Southwire Company, Appeal Brief in Inter Partes Reexamination of U.S. Pat. No. 7,749,024 (U.S. Appl. No. 95/000,594), Aug. 5, 2013, 63 pages, U.S.
United States Patent and Trademark Office, Reexam Petition Decision—Granted in Inter Partes Reexamination of U.S. Pat. No. 7,749,024 (U.S. Appl. No. 95/000,594), Oct. 25, 2013, 8 pages, U.S.
United States Patent and Trademark Office, Examiner's Answer in Inter Partes Reexamination of U.S. Pat. No. 7,749,024 (U.S. Appl. No. 95/000,594), Dec. 4, 2013, 3 pages, U.S.
Southwire Company, Rebuttal Brief in Inter Partes Reexamination of U.S. Pat. No. 7,749,024 (U.S. Appl. No. 95/000,594), Jan. 6, 2014, 16 pages, U.S.
Cerro Wire Inc., Rebuttal Brief in Inter Partes Reexamination of U.S. Pat. No. 7,749,024 (U.S. Appl. No. 95/000,594), Jan. 6, 2014, 18 pages, U.S.
United States Patent and Trademark Office, Patent Board Decision—Examiner Affirmed in Inter Partes Reexamination of U.S. Pat. No. 7,749,024 (U.S. Appl. No. 95/000,594), Jul. 16, 2014, 20 pages, U.S.
Southwire Company, Notice of Appeal to U.S. Court of Appeals for the Federal Circuit in Inter Partes Reexamination of U.S. Pat. No. 7,749,024 (U.S. Appl. No. 95/000,594), Sep. 19, 2014, 6 pages, U.S.
Cerro Wire Inc., Notice of Cross-Appeal to U.S. Court of Appeals for the Federal Circuit in Inter Partes Reexamination of U.S. Pat. No. 7,749,024 (U.S. Appl. No. 95/000,594), Sep. 29, 2014, 4 pages, U.S.
Cerro Wire Inc., Request for Inter Partes Reexamination of U.S. Pat. No. 8,043,119 (U.S. Appl. No. 95/000,695), Sep. 14, 2012, 95 pages, U.S.
United States Patent and Trademark Office, Order Granting Inter Partes Reexamination of U.S. Pat. No. 8,043,119 (U.S. Appl. No. 95/000,695) and Office Action, Nov. 13, 2012, 74 pages, U.S.
Southwire Company, Response in Inter Partes Reexamination of U.S. Pat. No. 8,043,119 (U.S. Appl. No. 95/000,695), May 16, 2013, 163 pages, U.S.
Cerro Wire Inc., Response in Inter Partes Reexamination of U.S. Pat. No. 8,043,119 (U.S. Appl. No. 95/000,695), Jun. 17, 2013, 89 pages, U.S.

United States Patent and Trademark Office, Office Action for Inter Partes Reexamination of U.S. Pat. No. 8,043,119 (U.S. Appl. No. 95/000,695), Feb. 14, 2014, 116 pages, U.S.
Southwire Company, Response in Inter Partes Reexamination of U.S. Pat. No. 8,043,119 (U.S. Appl. No. 95/000,695), Apr. 14, 2014, 37 pages, U.S.
Cerro Wire Inc., Response in Inter Partes Reexamination of U.S. Pat. No. 8,043,119 (U.S. Appl. No. 95/000,695), May 14, 2014, 211 pages, U.S.
United States Patent and Trademark Office, Right of Appeal Notice Prosecution for Inter Partes Reexamination of U.S. Pat. No. 8,043,119 (U.S. Appl. No. 95/000,695), Aug. 28, 2014, 7 pages, U.S.
Southwire Company, Response in Inter Partes Reexamination of U.S. Pat. No. 8,043,119 (U.S. Appl. No. 95/000,695), Sep. 29, 2014, 7 pages, U.S.
Cerro Wire Inc., Response in Inter Partes Reexamination of U.S. Pat. No. 8,043,119 (U.S. Appl. No. 95/000,695), Oct. 10, 2014, 7 pages, U.S.
Cerro Wire Inc., Respondent Brief in Inter Partes Reexamination of U.S. Pat. No. 8,043,119 (U.S. Appl. No. 95/000,695), Jan. 12, 2015, 136 pages, U.S.
United States Patent and Trademark Office, Proceeding Forwarded to Patent Trial and Appeal Board Inter Partes Reexamination of U.S. Pat. No. 8,043,119 (U.S. Appl. No. 95/000,695), Mar. 23, 2015, 3 pages, U.S.
Cerro Wire LLC., Request for Inter Partes Reexamination of U.S. Pat. No. 7,557,301 (U.S. Appl. No. 95/000,696), Sep. 14, 2012, 96 pages, U.S.
United States Patent and Trademark Office, Order Granting Reexamination and Office Action in Inter Partes Reexamination of U.S. Pat. No. 7,557,301 (U.S. Appl. No. 95/000,696), Dec. 12, 2012, 43 pages, U.S.
Southwire Company, Response in Inter Partes Reexamination of U.S. Pat. No. 7,557,301 (U.S. Appl. No. 95/000,696), Feb. 11, 2013, 146 pages, U.S.
Cerro Wire LLC., Response for Inter Partes Reexamination of U.S. Pat. No. 7,557,301 (U.S. Appl. No. 95/000,696), Mar. 13, 2013, 49 pages, U.S.
United States Patent and Trademark Office, Right of Notice to Appeal in Inter Partes Reexamination of U.S. Pat. No. 7,557,301 (U.S. Appl. No. 95/000,696), Jan. 17, 2014, 83 pages, U.S.
Cerro Wire Inc., Response in Inter Partes Reexamination of U.S. Pat. No. 7,557,301 (U.S. Appl. No. 95/000,696), Jan. 24, 2014, 14 pages, U.S.
United States Patent and Trademark Office, Right of Notice to Appeal in Inter Partes Reexamination of U.S. Pat. No. 7,557,301 (U.S. Appl. No. 95/000,696), Feb. 19, 2014, 87 pages, U.S.
United States Patent and Trademark Office, Petition Decision in Inter Partes Reexamination of U.S. Pat. No. 7,557,301 (U.S. Appl. No. 95/000,696), Feb. 26, 2014, 4 pages, U.S.
Southwire Company, Notice of Appeal in Inter Partes Reexamination of U.S. Pat. No. 7,557,301 (U.S. Appl. No. 95/000,696), Mar. 21, 2014, 10 page, U.S.
Cerro Wire Inc., Notice of Cross Appeal in Inter Partes Reexamination of U.S. Pat. No. 7,557,301 (U.S. Appl. No. 95/000,696), Apr. 4, 2014, 1 pages, U.S.
Southwire Company, Request for Oral Hearing in Inter Partes Reexamination of U.S. Pat. No. 7,557,301 (U.S. Appl. No. 95/000,696), Oct. 28, 2014, 5 pages, U.S.
United States Patent and Trademark Office, Notice of Hearing in Inter Partes Reexamination of U.S. Pat. No. 7,557,301 (U.S. Appl. No. 95/000,696), Jun. 8, 2015, 4 pages, U.S.
*Southwire Company v. Encore Wire Corporation and Cerro Wire Inc.*, Plaintiff's Opening Claim Construction Brief, Civil Action No. 6:09-cv-289-LED, U.S.D.C., Eastern District of Texas, Tyler Division, Sep. 7, 2010, 103 pages, U.S.
*Southwire Company v. Encore Wire Corporation and Cerro Wire Inc.*, Joint Claim Construction Chart, Civil Action No. 6:09-cv-289-LED, U.S.D.C., Eastern District of Texas, Tyler Division, Oct. 7, 2010, 11 pages, U.S.
*Southwire Company v. Encore Wire Corporation and Cerro Wire Inc.*, Plaintiff's Claim Construction Reply Brief, Civil Action No.

(56) References Cited

OTHER PUBLICATIONS

6:09-cv-289-LED, U.S.D.C., Eastern District of Texas, Tyler Division, Oct. 7, 2010, 67 pages, U.S.
Southwire Company, Applicant's Request for Further Processing of European Application No. 06739714.1, Mar. 7, 2011, 16 pages, Germany.
European Patent Office, Office Action for Application No. 06739714. 1, Aug. 25, 2011, 5 pages, The Netherlands.
European Patent Office, Third Party Observations for Application No. 06739714.1, May 21, 2012, 237 pages, The Netherlands.
Southwire Company, Applicant's Response in European Application No. 06739714.1, Jun. 25, 2012, 27 pages, Germany.
European Patent Office, Office Action for Application No. 06739714. 1, Feb. 5, 2013, 9 pages, The Netherlands.
Southwire Company, Applicant's Response in European Application No. 06739714.1, Jun. 14, 2013, 15 pages, Germany.
European Patent Office, Office Action for Application No. 06739714. 1, Jun. 26, 2013, 5 pages, The Netherlands.
Southwire Company, Applicant's Response in European Application No. 06739714.1, Feb. 13, 2014, 12 pages, Germany.
European Patent Office, Extended European Search Report for Application No. 06770960.0, Aug. 21, 2008, 5 pages, The Netherlands.
Southwire Company, Applicant's Response in European Application No. 06770960.0, Sep. 29, 2009, 9 pages, Germany.
European Patent Office, Third Party Observations for Application No. 06770960.0, Apr. 19, 2012, 231 pages, The Netherlands.
European Patent Office, Minutes of Oral Proceeding for Application No. 06770960.0, Jun. 25, 2012, 5 pages, The Netherlands.
Southwire Company, Reply to Notice of Opposition in European Application No. 06770960.0, Jun. 9, 2014, 109 pages, Germany.
International Preliminary Examining Authority, International Preliminary Report on Patentability for International Application No. PCT/US2005/005165, Jan. 16, 2007, 6 pages, the International Bureau of WIPO, Switzerland.
International Preliminary Examining Authority, International Preliminary Report on Patentability for International Application No. PCT/US2006/011069, Nov. 30, 2007, 7 pages, the International Bureau of WIPO, Switzerland.
International Preliminary Examining Authority, International Preliminary Report on Patentability for International Application No. PCT/US2006/019923, Nov. 30, 2007, 8 pages, the International Bureau of WIPO, Switzerland.
International Preliminary Examining Authority, International Preliminary Report on Patentability for International Application No. PCT/US2010/027684, Sep. 20, 2011, 8 pages, the International Bureau of WIPO, Switzerland.
Southwire Company, LLC, Joint Appendix in *Southwire Company, LLC v. Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal.Circuit, 2015-1117, -1118, May 18, 2015, 289 pages.
*Southwire Company, LLC V. Cerro Wire LLC*, Oral Arguments can be retrieved from <http://oralarguments.cafc.uscourts.gov/default. aspx?fl=2015-1117.mp3>, Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Oct. 7, 2015.
Encore Wire Corporation, Corrected Joint Appendix in *Encore Wire Corporation v. Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jul. 28, 2015, 427 pages.
*Encore Wire Corporation V. Southwire Company, LLC*, Oral Arguments can be retrieved from <http://oralarguments.cafc.uscourts. gov/default.aspx?fl=2015-1249.mp3>, Appeals from United States Patent and Trademark Office, Patent Trial and Appeal Board in No.

2014-000135 (relating to U.S. Pat. No. 7,749,024 and U.S. Appl. No.95/000,573), United States Court of Appeals for the Federal Circuit, 2015-1249, -1250, Oct. 7, 2015.
Cerro Wire LLC., Request for Oral Hearing for Inter Partes Reexamination of U.S. Pat. No. 7,557,301 (U.S. Appl. No. 95/000,696), Jun. 24, 2015, 10 pages, U.S.
Southwire Company, Confirmation of Hearing by Appellant in Inter Partes Reexamination of U.S. Pat. No. 7,557,301 (U.S. Appl. No. 95/000,696), Jun. 29, 2015, 5 pages, U.S.
United States Patent and Trademark Office, Record of Oral Hearing Held: Aug. 19, 2015 in Inter Partes Reexamination of U.S. Pat. No. 7,557,301 (U.S. Appl. No. 95/000,696), Sep. 15, 2015, 44 pages, U.S.
United States Patent and Trademark Office, PTAB Decision on Appeal in Inter Partes Reexamination of U.S. Pat. No. 7,557,301 (U.S. Appl. No. 95/000,696), Sep. 29, 2015, 28 pages, U.S.
Cerro Wire LLC., Requestor Comments in Opposition to Request for Rehearing in Inter Partes Reexamination of U.S. Pat. No. 7,557,301 (U.S. Appl. No. 95/000,696), Nov. 30, 2015, 10 pages, U.S.
Cerro Wire, Inc.; Exhibit W-1-W-10 (Claim Charts), Request for Inter Partes Reexamination Under 35 U.S.C. M311-318 (Control No. 95/000,594); Nov. 17, 2010; pp. 1-1023 (US).
Cerro Wire, Inc.; Exhibit W-11-W-20 (Claim Charts), Request for Inter Partes Reexamination Under 35 U.S.C. M311-318 (Control No. 95/000,594); Nov. 17, 2010; pp. 1-1023 (US).
Cerro Wire, Inc.; Exhibit W-21-W-30 (Claim Charts), Request for Inter Partes Reexamination Under 35 U.S.C. M311-318 (Control No. 95/000,594); Nov. 17, 2010; pp. 1-1023 (US).
Office Action for Co-Pending Patent Application No. 88656 in Panama mailed Oct. 6, 2011, 2 pgs.
International Searching Authority, International Search Report and Written Opinion for International Application No. PCT/US05/ 05251, Jul. 5, 2005, 4 pages, United States Patent and Trademark Office, U.S.A.
International Preliminary Examining Authority, International Preliminary Report on Patentability for International Application No. PCT/US05/05251, Mar. 14, 2006, 4 pages, United States Patent and Trademark Office, U.S.A.
International Searching Authority, International Search Report and Written Opinion for International Application No. PCT/US06/ 11070, Dec. 27, 2006, 7 pages, United States Patent and Trademark Office, U.S.A.
International Searching Authority, International Search Report and Written Opinion for International Application No. PCT/US06/ 10929, Aug. 1, 2006, 4 pages, United States Patent and Trademark Office, U.S.A.
International Preliminary Examining Authority, International Preliminary Report on Patentability for International Application No. PCT/US2006/010929, Nov. 30, 2007, 4 pages, United States Patent and Trademark Office, U.S.A.
Office Action for Co-Pending Japanese Patent Application No. 2013-150174, mailed Jul. 22, 2014, 11 pages.
United States Patent and Trademark Office, Office Action in Ex Parte Examination of U.S. Pat. No. 7,557,301 (U.S. Appl. No. 90/009,589), May 4, 2010, 31 pages, U.S.
United States Patent and Trademark Office, Office Action in Ex Parte Reexamination of U.S. Pat. No. 7,557,301 (U.S. Appl. No. 90/009,592), Sep. 24, 2010, 16 pages, U.S.
United States Patent and Trademark Office, Decision to Merge Proceedings in Ex Parte Reexamination of U.S. Pat. No. 7,557,301 (U.S. Appl. Nos. 90/009,589 and 90/009,592), Nov. 23, 2010, 10 pages, U.S.
United States Patent and Trademark Office, Office Action in Ex Parte Reexamination of U.S. Pat. No. 7,557,301 (U.S. Appl. Nos. 90/009,589 and 90/009,592), Jun. 23 2011, 24 pages, U.S.
United States Patent and Trademark Office, Reexamination Certificate Issued for U.S. Pat. No. 7,557,301 (U.S. Appl. Nos. 90/009,589 and 90/009,592), Dec. 27, 2011, 4 pages, U.S.
United States Patent and Trademark Office, Closing Action for Inter Partes Reexamination of U.S. Pat. No. 7,411,129 and Office Action (U.S. Appl. No. 95/000,403), Jul. 1, 2009, 41 pages, U.S.

(56) References Cited

OTHER PUBLICATIONS

Southwire Company, Response in Inter Partes Reexamination of U.S. Pat. No. 7,411,129 (U.S. Appl. No. 95/000,403), Sep. 1, 2009, 27 pages, U.S.
Cerro Wire Inc., Response in Inter Partes Reexamination of U.S. Pat. No. 7,411,129 (U.S. Appl. No. 95/000,403), Sep. 30, 2009, 38 pages, U.S.
Cerro Wire Inc., Response in Inter Partes Reexamination of U.S. Pat. No. 7,411,129 (U.S. Appl. No. 95/000,403), Jul. 14, 2010, 32 pages, U.S.
Southwire Company, Cross-Respondent Patent Owner's Brief in Inter Partes Reexamination of U.S. Pat. No. 7,411,129 (U.S. Appl. Nos. 95/000,403), Sep. 13, 2010, 23 pages, U.S.
Cerro Wire Inc., Corrected Respondent Brief in Inter Partes Reexamination of U.S. Pat. No. 7,411,129 (U.S. Appl. No. 95/000,403), Dec. 10, 2010, 16 pages, U.S.
United States Patent and Trademark Office, Examiner's Answer to Appeal Brief in Inter Partes Reexamination of U.S. Pat. No. 7,411,129 (U.S. Appl. No. 95/000,403), Sep. 21, 2012, 12 pages, U.S.
United States Patent and Trademark Office, Patent Board Remand to Examiner in Inter Partes Reexamination of U.S. Pat. No. 7,411,129 (U.S. Appl. No. 95/000,403), Jun. 13, 2014, 9 pages, U.S.
United States Patent and Trademark Office, Examiner's Determination on Patent Owner and Requester Comments after Board Decision in Inter Partes Reexamination of U.S. Pat. No. 7,411,129 (U.S. Appl. No. 95/000,403), Dec. 30, 2014, 15 pages, U.S.
Southwire Company, Response in Inter Partes Reexamination of U.S. Pat. No. 7,411,129 (U.S. Appl. Nos. 95/000,403), Jan. 30, 2015, 22 pages, U.S.
Cerro Wire Inc., Response in Inter Partes Reexamination of U.S. Pat. No. 7,411,129 (U.S. Appl. No. 95/000,403), Mar. 2, 2015, 18 pages, U.S.
United States Patent and Trade Mark Office, Board Decision, Examiner Affirmed in Part in Inter Partes Reexamination of U.S. Pat. No. 7,749,024 (U.S. Appl. No. 95/000,573), Mar. 28, 2014, 20 pages, U.S.
United States Patent and Trademark Office, Action Closing Prosecution for Inter Partes Reexamination of U.S. Pat. No. 8,043,119 (U.S. Appl. No. 95/000,695), Jul. 2, 2013, 104 pages, U.S.
Southwire Company, Appeal Brief in Inter Partes Reexamination of U.S. Pat. No. 8,043,119 (U.S. Appl. No. 95/000,695), Dec. 10, 2014, 34 pages, U.S.
Cerro Wire Inc., Appeal Brief in Inter Partes Reexamination of U.S. Pat. No. 8,043,119 (U.S. Appl. No. 95/000,695), Dec. 10, 2014, 135 pages, U.S.
Southwire Company, Respondent Brief in Inter Partes Reexamination of U.S. Pat. No. 8,043,119 (U.S. Appl. No. 95/000,695), Jan. 9, 2015, 25 pages, U.S.
United States Patent and Trademark Office, Examiner's Answer in Inter Partes Reexamination of U.S. Pat. No. 8,043,119 (U.S. Appl. No. 95/000,695), Feb. 4, 2015, 3 pages, U.S.
Southwire Company, Rebuttal Brief in Inter Partes Reexamination of U.S. Pat. No. 8,043,119 (U.S. Appl. No. 95/000,695), Mar. 4, 2015, 6 pages, U.S.
Cerro Wire Inc., Rebuttal Brief in Inter Partes Reexamination of U.S. Pat. No. 8,043,119 (U.S. Appl. No. 95/000,695), Mar. 4, 2015, 18 pages, U.S.
United States Patent and Trademark Office, Closing Action in Inter Partes Reexamination of U.S. Pat. No. 7,557,301 (U.S. Appl. No. 95/000,696), Nov. 6, 2013, 81 pages, U.S.
Southwire Company, Response in Inter Partes Reexamination of U.S. Pat. No. 7,557,301 (U.S. Appl. No. 95/000,696), Dec. 6, 2013, 19 pages, U.S.
Cerro Wire Inc., Response in Inter Partes Reexamination of U.S. Pat. No. 7,557,301 (U.S. Appl. No. 95/000,696), Jan. 6, 2014, 40 pages, U.S.
Southwire Company, Appeal Brief in Inter Partes Reexamination of U.S. Pat. No. 7,557,301 (U.S. Appl. No. 95/000,696), May 21, 2014, 134 pages, U.S.
Cerro Wire Inc., Appeal Brief in Inter Partes Reexamination of U.S. Pat. No. 7,557,301 (U.S. Appl. No. 95/000,696), Jun. 3, 2014, 76 pages, U.S.
Southwire Company, Corrected Appeal Brief in Inter Partes Reexamination of U.S. Pat. No. 7,557,301 (U.S. Appl. No. 95/000,696), Jun. 30, 2014, 133 pages, U.S.
Southwire Company, Response to Respondent's Appeal Brief in Inter Partes Reexamination of U.S. Pat. No. 7,557,301 (U.S. Appl. No. 95/000,696), Jul. 3, 2014, 10 pages, U.S.
Cerro Wire Inc., Respondent Brief by Third Party Requestor in Inter Partes Reexamination of U.S. Pat. No. 7,557,301 (U.S. Appl. No. 95/000,696), Jul. 30, 2014, 95 pages, U.S.
United States Patent and Trademark Office, Examiner's Answer in Inter Partes Reexamination of U.S. Pat. No. 7,557,301 (U.S. Appl. No. 95/000,696), Aug. 28, 2014, 3 pages, U.S.
Southwire Company, Response to Respondent's Rebuttal Brief in Inter Partes Reexamination of U.S. Pat. No. 7,557,301 (U.S. Appl. No. 95/000,696), Sep. 29, 2014, 6 pages, U.S.
Cerro Wire Inc., Rebuttal Brief on Appeal by Appellant Requestor in Inter Partes Reexamination of U.S. Pat. No. 7,557,301 (U.S. Appl. No. 95/000,696), Sep. 29, 2014, 14 pages, U.S.
Southwire Company, Opening Brief of Appellant in *Southwire Company* v. *Cerro Wire, Inc.*, Appeal from United States Patent and Trademark Office, Patent Trial and Appeal Board in No. 2014-005956, United States Court of Appeals for the Federal Circuit, 15/1117,-1118, Dec. 29, 2014, 63 pages, U.S.
Cerro Wire LLC, Corrected Response Brief for Cross-Appellant in *Southwire Company, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for The Federal Circuit, 2015-1117,-1118, Mar. 2, 2015, 59 pages.
Southwire Company, LLC, Response and Reply Brief of Appellant in *Southwire, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117,-1118, Apr. 21, 2015, 60 pages.
Cerro Wire LLC, Reply Brief for Cross-Appellant in *Southwire Company, LLC*.v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, May 7, 2015, 25 pages.
United States Court of Appeals, *Southwire Company, LLC* v. *Cerro Wire, LLC*, Judgment (Affirmed), Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for The Federal Circuit, 2015-1117,-1118, Oct. 20, 2015, 2 pages.
Encore Wire Corporation, Opening Brief of Appellant in *Encore Wire Corporation* v. *Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249,-1250, Mar. 10, 2015, 84 pages.
Southwire Company, LLC, Principal and Response Brief of Cross-Appellant in *Encore Wire Corporation* v. *Southwire Company, LLC*, Appeal from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249,-1250, Apr. 23, 2015, 70 pages.
Encore Wire Corporation, Reply and Response Brief of Appellant/Cross-Appellee in *Encore Wire Corporation* v. *Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249,-1250, Jun. 11, 2015, 41 pages.
Southwire Company, LLC, Reply Brief of Cross-Appellant in *Encore Wire Corporation* v. *Southwire Company, LLC*, Appeal from United States Patent and Trademark Office, Patent Trial and Appeal

(56) References Cited

OTHER PUBLICATIONS

Board in No. 2014-000135 (relating to U.S. Pat. No. 7,749,024 and U.S. Appl. No. 95/000,573), United States Court of Appeals for the Federal Circuit, 2015-1249,-1250, Jun. 25, 2015, 25 pages.
United States Court of Appeals, Encore *Wire Corporation* v. *Southwire Company, LLC*, Order (Dismissed), Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249,-1250, Oct. 20, 2015, 2 pages.
Southwire Company, Appellant's Request for Rehearing Following a Decision on Appeal in Inter Partes Reexamination of U.S. Pat. No. 7,557,301 (U.S. Appl. No. 95/000,696), Oct. 29, 2015, 20 pages, U.S.
American Polywater Corporation, "www.polywater.com/techtak1.html" Copyright 2001-2015, Dec. 21, 1997 to Jul. 29, 2015 Internet Archive <http://web.archive.org/web/*/http://www.polywater.com/techtak1.html>, 5 pages.
American Polywater Corporation, "www.polywater.com/3000tech.html", Copyright 2001-2015, Jan. 6, 2009 to Jul. 27, 2015 Internet Archive <http://web.archive.org/web/*/http://www.polywater.com/3000tech.html>, 4 page.
United States Patent and Trademark Office, Office Action for U.S. Appl. No. 14/620,963, Apr. 6, 2016, 16 pages, U.S.A.
United States Patent and Trademark Office, Decision: Rehearing Granted in Part, in Inter Partes Reexamination of U.S. Pat. No. 7,557,301 (U.S. Appl. No. 95/000,696), May 2, 2016, 17 pages, U.S.A.
United States Patent and Trademark Office, PTAB Docketing Notice in Inter Partes Reexamination of U.S. Pat. No. 7,411,129 (U.S. Appl. No. 95/000,403), Jun. 2, 2016, 3 pages, U.S.A.
United States Patent and Trademark Office, PTAB Docketing Notice Transmitted to Third Party Requestor in Inter Partes Reexamination of U.S. Pat. No. 7,411,129 (U.S. Appl. No. 95/000,403), Jun. 2, 2016, 5 pages., U.S.A.
United States Patent and Trademark Office, Notice of Intent to Issue Inter Partes Reexamination Certificate in Inter Partes Reexamination of U.S. Pat. No. 7,749,024 (U.S. Appl. No. 95/000,594) and Office Action, Jun. 7, 2016, 7 pages, U.S.A.
United States Patent and Trademark Office, Prioritized Examination Granted for U.S. Appl. No. 15/068,150, Jun. 16, 2016, 5 pages, U.S.A.
Southwire Company, LLC, Notice of Appeal to the U.S. Court of Appeals for the Federal Circuit in Inter Partes Reexamination of U.S. Pat. No. 7,411,129 B2 (U.S. Appl. No. 95/000,403), Sep. 13, 2016, 3 pages, U.S.
United States Patent and Trademark Office, Decision on Examiner's Determination (Affirmed) in Inter Partes Reexamination of U.S. Pat. No. 7,411,129 B2 (U.S. Appl. No. 95/000,403), Jul. 13, 2016, 6 pages, U.S.
United States Patent and Trademark Office, Decision Vacating Reexam in Inter Partes Reexamination of U.S. Pat. No. 7,749,024 (U.S. Appl. No. 95/000,573), Aug. 2, 2016, 20 pages, U.S.
United States Patent and Trademark Office, Notice of Allowance for U.S. Appl. No. 15/068,150, Jul. 19, 2016, 48 pages, U.S.
United States Patent and Trademark Office, Issuance of Supplemental Examination Certificate U.S. Pat. No. 8,382,518 F1 (U.S. Appl. No. 96/000,144), Aug. 16, 2016, 2 pages, U.S.
United States Patent and Trademark Office, Reasons for Substantial New Question of Patentability Determination for U.S. Pat. No. 8,382,518 (U.S. Appl. No. 96/000,144), Aug. 16, 2016, 32 pages, U.S.
United States Patent and Trademark Office, Office Action for Ex Parte Reexam of U.S. Pat. No. 8,382,518 (U.S. Appl. No. 96/000,144), Sep. 8, 2016, 36 pages, U.S.
United States Patent and Trademark Office, Ex Parte Reexamination Ordered of U.S. 8,382,518 (U.S. Appl. No. 96/000,144), Sep. 8, 2016, 2 pages, U.S.
Southwire Company and Cerro Wire LLC, (Joint) Stipulated Motion to Voluntarily Dismiss Appeal in *Southwire Company* v. *Cerro Wire LLC*, U.S. Court of Appeals for the Federal Circuit No. 2016-2643 (relating to U.S. Pat. No. 7,411,129, Control/U.S. Appl. No. 95/000,403), Jan. 26, 2017, 7 pages.
Southwire Company, Patent Owner's Written Statement of an Interview with the Examiner for Ex Parte Reexamination of U.S. Pat. No. 8,382,518 (U.S. Appl. No. 96/000,144), Dec. 2, 2016, 12 pages, U.S.
Southwire Company, Response to Non-final Office Action for Ex Parte Reexamination of U.S. Pat. No. 8,382,518 (U.S. Appl. No. 96/000,144), Nov. 8, 2016, 104 pages, U.S.
Southwire Company, Unopposed Motion for Extension of Time to File Appellant's Opening Brief in *Southwire Company* v. *Cerro Wire LLC*, U.S. Court of Appeals for the Federal Circuit No. 2016-2643 (relating to U.S. Pat. No. 7,411,129, Control/U.S. Appl. No. 95/000,403), Dec. 7, 2016, 8 pages.
United States Court of Appeals for the Federal Circuit, Order (Dismissing Proceeding) in *Southwire Company* v. *Cerro Wire LLC*, U.S. Court of Appeals for the Federal Circuit No. 2016-2643 (relating to U.S. Pat. No. 7,411,129, Control/U.S. Appl. No. 95/000,403), Jan. 27, 2017, 2 pages.
United States Patent and Trademark Office, Examiner's Ex Parte Reexamination Interview Summary for Ex Parte Reexamination of U.S. Pat. No. 8,382,518 (U.S. Appl. No. 96/000,144), Jan. 9, 2017, 3 pages, U.S.A.
United States Patent and Trademark Office, Office Action in Ex Parte Reexamination of U.S. Pat. No. 8,382,518 (U.S. Appl. No. 96/000,144), dated Mar. 20, 2017, 149 pages, U.S.A.
Southwire Company, Patent Owner's Agenda for Interview with the Examiner for Ex Parte Reexamination of U.S. Pat. No. 8,382,518 (U.S. Appl. No. 96/000,144), dated Apr. 28, 2017, 9 pages, U.S.A.
United States Patent and Trademark Office, Interview Attachment (Miscellaneous Internal Document) in Ex Parte Reexamination of U.S. Pat. No. 8,382,518 (U.S. Appl. No. 96/000,144), dated May 3, 2017, 14 pages, U.S.A.
Southwire Company, Patent Owner's Response to Non-Final Office Action, including Written Statement of May 3, 2017 Interview in Ex Parte Reexamination of U.S. Pat. No. 8,382,518 (U.S. Appl. No. 96/000,144), dated May 22, 2017, 343 pages, U.S.A.
U.S. Appl. No. 14/666,105, Preliminary Amendment Claims, dated Mar. 23, 2015, 5 pages.
Cerro Wire Inc., Request for Rehearing in Inter Partes Reexamination of U.S. Pat. No. 8,043,119 (U.S. Appl. No. 95/000,695), dated Feb. 16, 2018, 15 pages, U.S.A.
Southwire Company, LLC, Response to Decision on Appeal in Inter Partes Reexamination of U.S. Pat. No. 8,043,119 (U.S. Appl. No. 95/000,695), dated Feb. 16, 2018, 286 pages, U.S.A.
United States Patent and Trademark Office, Ex Parte Reexamination Certificate for U.S. Appl. No. 96/000,144 (U.S. Pat. No. 8,382,518), dated Jan. 26, 2018, 2 pages, U.S.A.
United States Patent and Trademark Office, Patent Board Decision on Appeal Affirming Examiner in Part for U.S. Appl. No. 95/000,695, dated Jan. 16, 2018, 37 pages, U.S.A.
Cerro Wire Inc., Requester Comments on Patent Owner Response after Board Decision, including Exhibits, in InterPartes Reexamination of U.S. Pat. No. 8,043,119 (U.S. Appl. No. 95/000,695), dated Mar. 15, 2018, 122 pages, U.S.A.
Southwire Company, Patent Owner Comments on Request for Rehearing and Petition Under 37 C.F.R. § 41.3 to Strike Requester's Improper Paper in Inter Partes Reexamination of U.S. Pat. No. 8,043,119 (U.S. Appl. No. 95/000,695), dated Mar. 16, 2018, 53 pages, U.S.A.
Southwire Company, Response to Nov. 2, 2017 Non-Final Office Action and Terminal Disclaimer for U.S. Appl. No. 15/590,881, dated May 2, 2018, 44 pages, U.S.A.
United States Patent and Trademark Office, Electronic Approval of Terminal Disclaimer for U.S. Appl. No. 15/590,881, dated May 2, 2018, 1 pages, U.S.A.
United States Patent and Trademark Office, Summary of Applicant Initiated Interview for U.S. Appl. No. 15/590,881, dated Apr. 6, 2018, 4 pages, U.S.A.
U.S. Court of Appeals for the Federal Circuit, Opinion (PTAB Affirmed) in *Southwire Company* v. *Cerro Wire, Inc.*, U.S. Court of

(56) References Cited

OTHER PUBLICATIONS

Appeals for the Federal Circuit Case No. 2016-2287 (relating to U.S. Pat. No. 7,557,301, U.S. Appl. No. 95/000,696), dated Sep. 8, 2017, 11 pages.
United States Patent and Trademark Office, Final Office Action in Ex Parte Reexamination of U.S. Pat. No. 8,382,518 (U.S. Appl. No. 96/000,144), dated Jul. 14, 2017, 74 pages, U.S.A.
Southwire Company, Patent Owner's Response, including Terminal Disclaimer and Information Disclosure Statement, to Final Office Action in Ex Parte Reexamination of U.S. Pat. No. 8,382,518 (U.S. Appl. No. 96/000,144), dated Sep. 14, 2017, 33 pages, U.S.A.
Cerro Wire, Inc., Corrected Response Brief for Appellee in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), dated Dec. 23, 2016, 71 pages.
Southwire Company and Cerro Wire, Inc., Joint Appendix in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), dated Feb. 17, 2017, 323 pages.
Southwire Company, Opening Brief in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), dated Oct. 14, 2016, 131 pages.
Southwire Company, Reply Brief of the Appellant in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), dated Feb. 10, 2017, 37 pages.
United States Court of Appeals for the Federal Circuit, Order on Petition for Panel Rehearing and Rehearing *En Banc*—Denied—in *Southwire Company v. Cerro Wire, LLC*, U.S. Court of Appeals for the Federal Circuit Case No. 2016-2287, Dec. 5, 2017, 2 pages.
United States Patent and Trademark Office, Notice of Intent to Issue an Ex Parte Reexam Certificate for U.S. Appl. No. 96/000,144, dated Oct. 10, 2017, 7 pages, U.S.A.
United States Patent and Trademark Office, Office Action for U.S. Appl. No. 15/590,881, dated Nov. 2, 2017, 11 pages, U.S.A.
United States Patent and Trademark Office, Examiner's Determination on Patent Owner's Response for U.S. Appl. No. 95/000,695, dated Oct. 11, 2018, 23 pages, U.S.A.
United States Patent and Trademark Office, Office Action for U.S. Appl. No. 15/590,881, dated Sep. 5, 2018, 61 pages, U.S.A.
United States Patent and Trademark Office, Office Action for U.S. Appl. No. 16/015,688, dated Sep. 20, 2018, 65 pages, U.S.A.
Cerro Wire Inc., Requestor Comments in Response to Examiner's Determination after Board Decision for U.S. Appl. No. 95/000,695, dated Dec. 13, 2018, 18 pages, USA.
Southwire Company, Patent Owner's Comments in Response to Examiner's Determination after Board Decision for U.S. Appl. No. 95/000,695, dated Dec. 14, 2018, 26 pages, USA.
United States Patent and Trademark Office, Examiner's Determination after Board Decision for U.S. Appl. No. 95/000,695, dated Nov. 14, 2018, 23 pages, USA.
United States Patent and Trademark Office, Letter Restarting Period for Response for U.S. Appl. No. 16/015,688, dated Nov. 5, 2018, 15 pages, U.S.A.
United States Patent and Trademark Office, Office Action for U.S. Appl. No. 16/015,716, dated Nov. 16, 2018, 70 pages, USA.
United States Patent and Trademark Office, Decision on Petition, Denying Patent Owner's Petition to Strike Requester's Improper Paper, Inter Partes Reexamination of U.S. Pat. No. 8,043,119 (U.S. Appl. No. 95/000,695), dated May 10, 2018, 10 pages, U.S.
United States Patent and Trademark Office, Order Remanding Inter Partes Reexamination to the Examiner, Inter Partes Reexamination of U.S. Pat. No. 8,043,119 (U.S. Appl. No. 95/000,695), dated Jun. 5, 2018, 10 pages, U.S.

United States Patent and Trademark Office, Notice of Intent to Issue a Reexam Certificate in Inter Partes Reexamination of U.S. Pat. No. 7,557,301 (U.S. Appl. No. 95/000,696), dated May 18, 2018, 7 pages, U.S.
United States Patent and Trademark Office, Inter Partes Reexamination Certificate (1535th) U.S. Pat. No. 7,557,301 C2 in Inter Partes Reexamination of U.S. Pat. No. 7,557,301 (U.S. Appl. No. 95/000,696), dated Jun. 14, 2018, 2 pages, U.S.
Cerro Wire Inc., Requestor Reply to PO Comments to Examiner Determination, for U.S. Appl. No. 95/000,695, dated Jan. 14, 2019, 16 pages.
Southwire Company, Patent Owner's Reply to Requestor's Comments in Reponse to Examiners'Determination, for U.S. Appl. No. 95/000,695,dated Jan. 15, 2019, 20 pages.
United States Patent and Trademark Office, Patent Trial and Appeal Board Docketing Notice, for U.S. Appl. No. 95/000,695, dated Feb. 5, 2019, 3 pages, USA.
United States Patent and Trademark Office, Transmittal of Communication to Third Party Requester Inter Partes Reexamination, for U.S. Appl. No. 95/000,695, dated Feb. 5, 2019, 5 pages, USA.
United States Patent and Trademark Office, Final Office Action for U.S. Appl. No. 15/590,881, dated Apr. 4, 2019, 20 pages, USA.
Electronic Petition Request for Terminal Disclaimer, for U.S. Appl. No. 15/590,881, dated Apr. 30, 2019, 2 pages.
U.S. Appl. No. 16/015,716, Amendment, dated Feb. 19, 2019, 39 pages.
United States Patent and Trademark Office, Final Office Action for U.S. Appl. No. 16/015,716, dated Nov. 7, 2019, (33 pages). U.S.
United States Patent and Trademark Office, NonFinal Office Action for U.S. Appl. No. 15/590,881, dated Nov. 29, 2019, (14 pages), U.S.
United States Patent and Trademark Office, NonFinal Office Action for U.S. Appl. No. 16/015,688, dated Dec. 26, 2019, (21 pages), USA.
United States Patent and Trademark Office, Electronic Approval of Terminal Disclaimer for U.S. Appl. No. 15/590,881, dated Apr. 30, 2019, 1 page, USA.
U.S. Appl. No. 16/015,688, Amendment, dated Feb. 5, 2019, 37 pages.
Electronic Petition Request for Terminal Disclaimer, for U.S. Appl. No. 16/015,688, dated Apr. 30, 2019, 3 pages.
United States Patent and Trademark Office, Electronic Approval of Terminal Disclaimer for U.S. Appl. No. 16/015,688, dated Apr. 30, 2019, 1 page, USA.
United States Patent and Trademark Office, Applicant Initiated Interview Summary, for U.S. Appl. No. 16/015,688, dated Apr. 30, 2019, 3 pages, USA.
U.S. Appl. No. 16/015,716, Amendent, dated Feb. 19, 2019, 39 pages.
Electronic Petition Request for Terminal Disclaimer, for U.S. Appl. No. 16/015,716, dated Apr. 30, 2019, 3 pages.
United States Patent and Trademark Office, Electronic Approval of Terminal Disclaimer for U.S. Appl. No. 16/015,716, dated Apr. 30, 2019, 1 page, USA.
United States Patent and Trademark Office, Applicant Initiated Interview Summary, for U.S. Appl. No. 16/015,716, dated Apr. 30, 2019, 3 pages, USA.
United States Patent and Trademark Office, Decision on Request for Rehearing, Appeal 2019-002436, Reexamination U.S. Appl. No. 95/000,695, Technology Center 3900, U.S. Pat. No. 8,043,119, dated Jul. 1, 2020, (31 pages), U.S.
United States Patent and Trademark Office, Issue Notification for U.S. Appl. No. 16/015,716, dated Jun. 17, 2020, (1 page), U.S.
United States Patent and Trademark Office, Issue Notification for U.S. Appl. No. 15/590,881, dated Jun. 24, 2020, (1 page), U.S.

\* cited by examiner

METHOD OF MANUFACTURING ELECTRICAL CABLE, AND RESULTING PRODUCT, WITH REDUCED REQUIRED INSTALLATION PULLING FORCE

CROSS REFERENCE TO RELATED APPLICATIONS

This application is a continuation of U.S. application Ser. No. 14/144,150, filed Dec. 30, 2013, issuing as U.S. Pat. No. 9,142,336 on Sep. 22, 2015, which is a continuation of U.S. application Ser. No. 13/774,677, filed Feb. 22, 2013, now U.S. Pat. No. 8,616,918, issued Dec. 31, 2013, which is a continuation of U.S. application Ser. No. 13/274,052, filed Oct. 14, 2011, now U.S. Pat. No. 8,382,518, issued Feb. 26, 2013, which is a continuation of U.S. application Ser. No. 12/787,877, filed May 26, 2010, now U.S. Pat. No. 8,043,119, issued Oct. 25, 2011, which is a continuation of U.S. application Ser. No. 11/675,441, filed Feb. 15, 2007, now U.S. Pat. No. 7,749,024, issued Jul. 6, 2010, which is a continuation-in-part of U.S. application Ser. No. 11/120,487, filed May 3, 2005, now abandoned, which is a continuation-in-part of U.S. application Ser. No. 10/952,294, filed Sep. 28, 2004, now U.S. Pat. No. 7,411,129, issued Aug. 12, 2008. Each patent and patent application identified above is incorporated here by reference in its entirety.

FIELD OF THE INVENTION

The present invention relates to electrical cables, more particularly to THHN electrical cables, and even more particularly to methods for reducing the surface coefficient of friction and required installation pulling force thereof, as well as preferred pulling lubricant compositions for effecting such reductions.

BACKGROUND OF THE INVENTION

Electrical cables include a conductor core and typically include an outer jacket or sheath. The term "sheath," as used herein and throughout the specification and claims, is defined to mean the outermost protective jacket or covering surrounding a conductor core, whether of a single type material or multiple layers of the same or different material. The conductor core may typically be, for example, a single metal wire, multiple small wires twisted together to make a "stranded" cable, or multiple insulated wires or other type electrical conductors acting together to serve a particular function (e.g., three-phase connection). The sheath may comprise one or more layers of polymeric or other material to provide physical, mechanical, electrical insulating and/or chemical protection for the underlying cable components. For the purpose of type THHN cable of the present invention, the exterior portion of the sheath is of nylon. Specifically, type THHN cable comprises a conductor core of a single solid or stranded conductor, surrounded by a layer of polyvinyl chloride (PVC) electrical insulation, covered by an outer layer of nylon.

Installation of electrical cable often requires that it be pulled through tight spaces or small openings in, and in engagement with, narrow conduits, raceways, cabletrays, or passageways in rafters or joists. This becomes problematic since the exterior surface of the cable sheath normally has a high coefficient of friction, therefore requiring a large pulling force. Moreover, installation parameters include maximum allowable cable pulling tension and/or sidewall pressure limits. Exceeding these limits can result in degradation of the cable, physical damage and inferior installation.

To overcome this problem, the general industry practice has been to coat the exterior surface of the cable sheath with a pulling lubricant at the job site in order to reduce the coefficient of friction between this surface and the conduit walls or like surfaces, typically using vaselines or lubricants produced specifically, and well known in the industry for such purpose, such as Yellow 77® (hereinafter, "Y 77"). The term "pulling lubricant," as used herein and throughout the specification and claims, is defined to mean lubricating material which sufficiently reduces the coefficient of friction of the exterior surface of the sheath of the cable to facilitate the pulling of the cable.

The aforementioned industry practice of applying a pulling lubricant like Y 77 to the finished cable at the job site poses problems, principally due to the additional time, expense and manpower required to lubricate the finished cable surface at the job site as well as to clean up after the lubricating process is completed. Alternative solutions have been tried but are generally unsuccessful, including the extrusion of a lubricant layer over the extruded polymeric sheath during the manufacturing of the cable, or the application of granules of material to the still-hot sheath during the extrusion process, which granules are designed to become detached when the cable is pulled through the duct. However, these solutions not only require major alterations of the manufacturing line, but result in a loss in manufacturing time, increased economic costs, and undesirable fluctuations in the geometrical dimensions of the cable sheaths.

It is also important to an understanding of the present invention to know the difference between what are referred to as "pulling lubricants" and what are "processing lubricants." A pulling lubricant is a lubricant that appears at the outside surface of the sheath of the cable and is effective to lower the surface coefficient of friction such as to reduce the force necessary to pull the cable along or through building surfaces or enclosures. A processing lubricant is lubricating material that is used to facilitate the cable manufacturing process, such as the flow of polymer chains during any polymer compounding as well as during the extrusion processes while the polymer is in its molten or melt phase. Cable manufacturers have long used processing lubricants, such as stearic acid or ethylene bis-stearamide wax, as a minor component of the polymeric compound from which the cable sheath is formed. Because a processing lubricant is normally not effective except when the polymer is in this melt phase, the effect of a processing lubricant is essentially non-existent in the final hardened polymer sheath of the cable. Even where there may be an excessive amount of the processing lubricant, a separate pulling lubricant would still be required to sufficiently reduce the cable sheaths' exterior surface coefficient of friction in order to minimize the pulling force necessary to install the cable.

Accordingly, there has been a long-felt need for an effective method of providing a pulling lubricant at the exterior surface of the finished cable, and particularly the finished THHN cable, which is effective to reduce the cable surface coefficient of friction and minimize the required installation pulling force, without incurring the inconvenience and time-consuming operation and expense associated with the application of the pulling lubricant at the installation site, nor significantly increasing the complexity and cost of the manufacturing process, nor undesirably altering the geometrical characteristics of the cable sheaths.

SUMMARY OF THE INVENTION

The process of the present invention accomplishes these objectives for THHN cable by a cable manufacturing process in which a particular pulling lubricant, of optimum weight percentage or quantity, is introduced into the manufacturing process at a particular stage of manufacture, which results in the pulling lubricant being present in the outer sheath, so that it is available to reduce the coefficient of friction of the exterior sheath surface when the cable is to be installed. Depending upon the material of the sheath and the type of lubricant, this may be as a consequence of the migration, or delayed migration or "blooming," of the pulling lubricant to the sheath surface; or alternatively, due to the permeation of the pulling lubricant throughout the sheath. Under these circumstances, the pulling lubricant is effective to lower the surface coefficient of friction below that of the inherent coefficient of friction of the material from which the outer layer of the THHN sheath is formed, thereby reducing the required installation pulling force.

In accordance with the process of the invention, and as described below in greater detail, the pulling lubricant is selectively chosen to provide the optimum results with respect to the particular nylon sheath material, and may alternately be introduced into the THHN cable manufacturing process at various stages, ranging from the initial compounding of the lubricant with the polymeric nylon material to form lubricated pellets from which the sheath is to be formed, to mixing the lubricant with the nylon sheath material before introduction of the mixture into the extrusion process, to its introduction into the sheath extrusion process while the nylon sheath forming material is in its molten state.

BRIEF DESCRIPTION OF THE DRAWINGS

These and other details and aspects of the invention, as well as the advantages thereof, will be more readily understood and appreciated by those skilled in the art from the following detailed description, taken in conjunction with the accompanying drawings, in which.

DESCRIPTION

Figure 1:
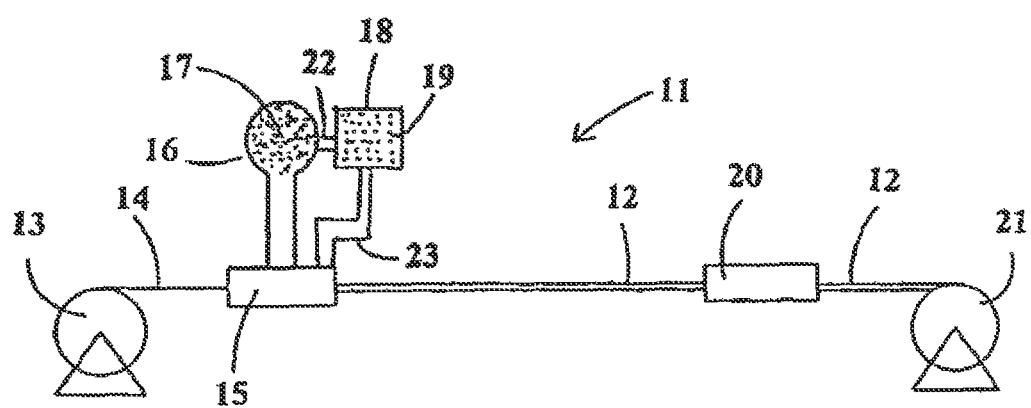
FIG. 1 is a diagrammatic representation of typical equipment used in the manufacture of cable in accordance with the present invention, when mixing the lubricant with the nylon material prior to extrusion.

Referring initially to FIG. 1, there is depicted typical equipment 11 for manufacturing electrical cable 12 in accordance with one process of the present invention. The outer sheath of the cable is of an extruded polymer material, specifically nylon. The equipment 11 may include a reel 13 which supplies conductor wire 14 to an extruding head 15. In flow communication with the extrusion head is a tank 16 of the nylon pellets 17. A tank 18 with the desired pulling lubricant 19 is adapted to be in flow communication with the tank 16 by way of conduit 22, thus enabling the mixing of the pulling lubricant with the nylon pellets 17, the mixture thereafter introduced into the extruder. Alternatively, the tank may be adapted to be in fluid communication with the extruder or extrusion head 15, by way of conduit 23, downstream from the point of entry of the nylon material, thus allowing the pulling lubricant to mix with the nylon material while in its molten state in the extruder or extruder head. A cooling box 20 for cooling the extruded product is provided, and a reel 21 is positioned for taking up the resulting cable assembly 12. When the final cable construction is such that there are multiple layers of sheath material, the pulling lubricant should desirably be incorporated into the outermost layer.

As is therefore evident, the pulling lubricant can be mixed with the material from which the outer sheath is to be extruded prior to extrusion or, alternatively, introduced into the extruding head for subsequent mixing with the molten extrusion material as the sheath is being formed. As a further alternative, the pulling lubricant can be initially compounded with the polymeric material of the pellets themselves in a process upstream of that depicted in FIG. 1, thereby forming lubricated polymeric pellets, thus eliminating the need for tank 18 and conduits 22 and 23.

Polymeric materials that can be used for an insulating layer or outer sheath of different type of cable include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like. As previously described, for the THHN cable of the present invention, the conductor core of a single solid or stranded conductor is surrounded by an insulating layer of PVC covered by an outer sheath of a polyamide (e.g., nylon).

In accordance with the testing subsequently described, it has been determined that, for THHN cable, silicone oil is the preferred pulling lubricant. For small gauge THHN wire, erucamide is an alternative preferred pulling lubricant, to be incorporated in the nylon sheath.

The efficacy of these pulling lubricants for the nylon sheath, and specifically an optimum range for the quantity of such lubricants, in accordance with the invention, has been proven by the use of various tests. Prior to discussing the results of such tests, these test methods and their equipment are described as follows:

TESTING METHODS

Coefficient of Friction Test

Figure 4:
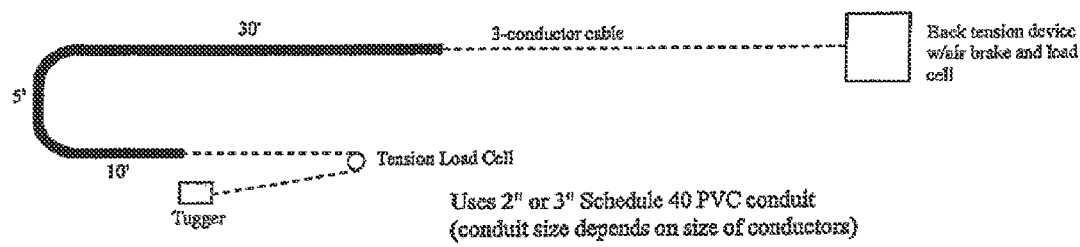
FIGS. 4 and 5 are representations of test devices which may be used to create the aforementioned test data.

Referring now to FIG. 4, diagrammatically illustrated is the apparatus for a coefficient of friction test. The coefficient of friction test apparatus was developed to give a consistent way to determine the input values necessary to use the industry-standard program published by PolyWater Corporation to calculate a real-world coefficient of friction for a given cable being pulled in conduit. Given the inputs for the conduit setup, the back tension on the wire, and the pulling tension on the pulling rope, this program back-calculated a coefficient of friction for the cable by subtracting the back tension from the pulling tension and attributing the remaining tension on the rope to frictional forces between the cable and the conduit.

The overall setup used a pulling rope threaded through ~40' of PVC conduit (appropriately sized for the cable being pulled) with two 90° bends. Three 100' pieces of THHN cable were cut and laid out parallel to one another in line with the first straight section of conduit, and the rope connected to them using industry-standard practice. The other end of the THHN cable was attached to a metal cable which was wrapped around a cylinder with an air brake to allow the application of constant back tension on the setup.

The metal cable was threaded through a load cell so that it could be monitored in real-time, and continuously logged. The pulling rope was similarly threaded through a load cell and constantly monitored and logged. Values for both back tension and pulling tension were logged for the time it took to pull cable through the conduit run. These values were then averaged and used in the PolyWater program to calculate coefficient of friction.

Specific Type THHN Tests

Figure 5:
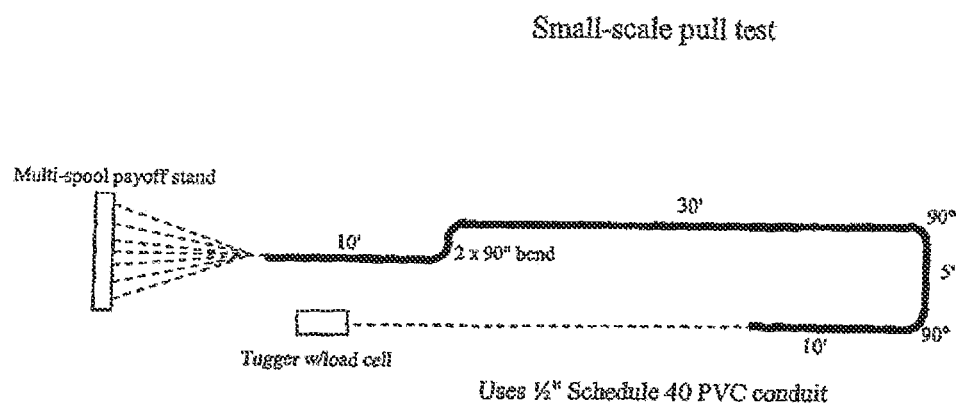

Initial tests of small gauge Type THHN wire were performed using the small-scale tension tester shown in FIG. 5. In this test, multiple individual American Wire Gauge (AWG) size 12 THHN wires were provided on the payoff and attached to a metal pulling tape that was threaded through an arrangement of ½" conduit that included about 50 feet of straight conduit and four 90° bends. A pulling rope was attached to the other end of the pulling tape and a tugger was used to pull the cable arrangement through the conduit. The rope was threaded through a pulley arrangement that used a load cell to monitor rope tension while the wire was pulled through the conduit. This tension was continuously logged and averaged to give an average pulling force for the pull. This force correlated directly to the coefficient of friction for the cable.

Figure 2:
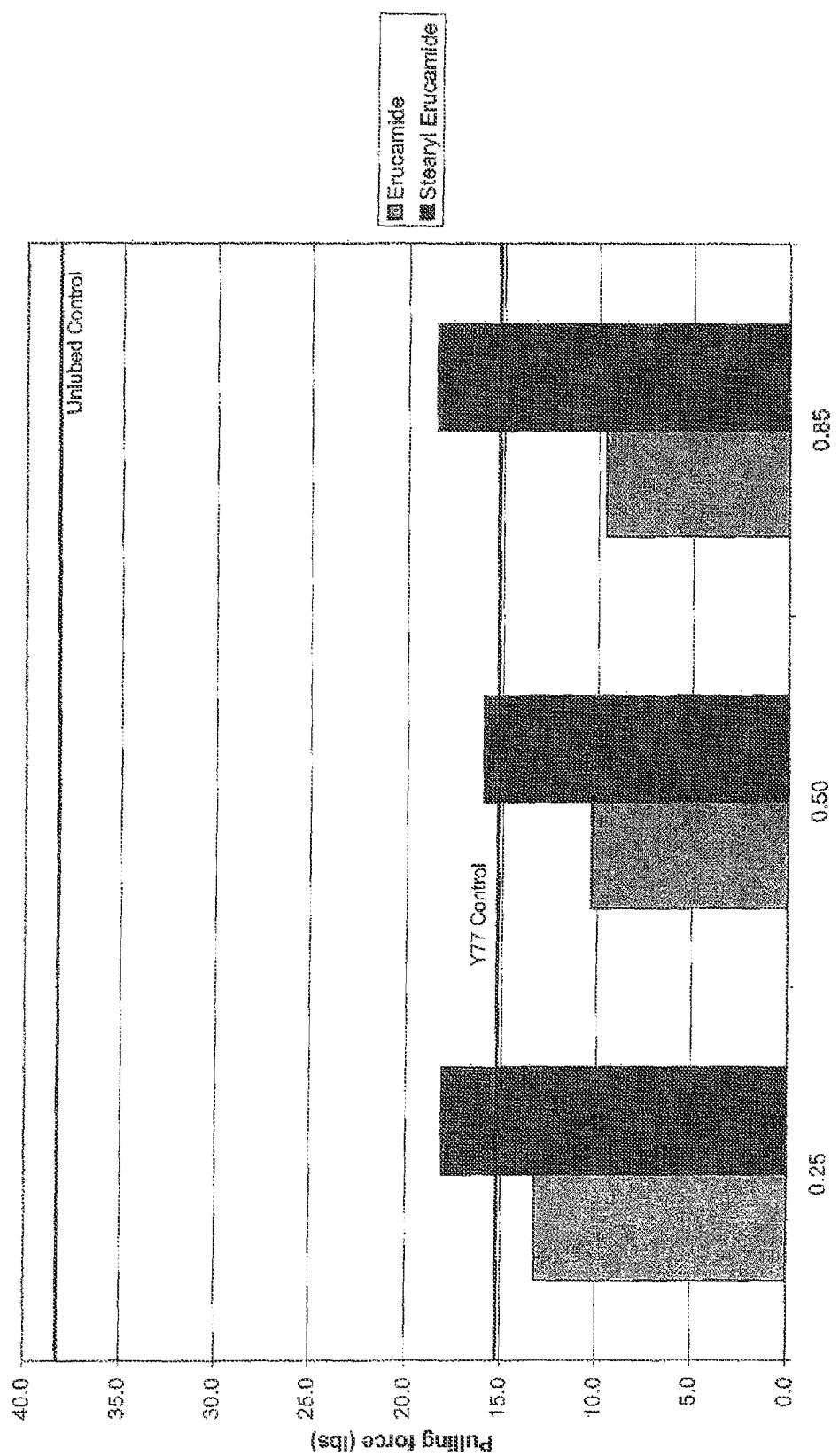
FIG. 2 is a graphical representation of test data comparing the effect of different pulling lubricants in small size THHN cable in which the outer sheath material is nylon.

Using the data obtained from the small scale pull test of FIG. 5, FIG. 2 illustrates a comparison of the different required pulling forces for a small gauge cable consisting of multiple (AWG) size 12 THHN conductors. The test subjects had 0.25-0.85% of two different potential pulling lubricants, erucamide and stearyl erucamide, mixed into the outer nylon sheath. Results of the test are shown in FIG. 2 and compared to the results for the standard THHN product without any pulling lubricant and with the externally applied industry-standard Y77. This test shows that erucamide is one preferred lubricant for small gauge THHN cable, in an optimum percentage of approximately 0.85%, by weight.

Figure 3:
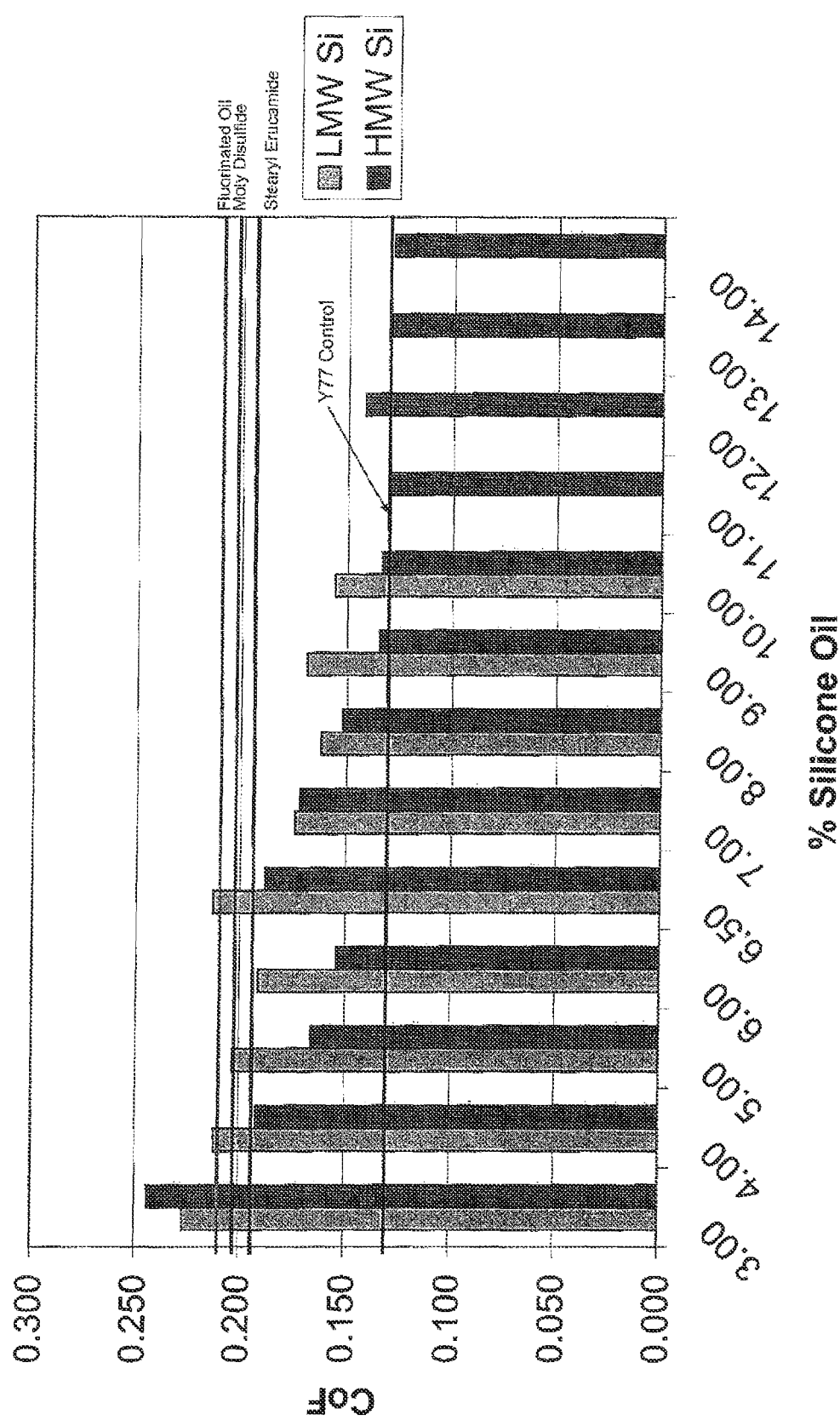
FIG. 3 is a graphical representation of test data comparing both the effects of different pulling lubricants and different percentages of pulling lubricant in large size THHN cable in which the outer sheath material is nylon.

Next, large gauge Type THHN cable was tested. Using the coefficient of friction test of FIG. 4, FIG. 3 illustrates the different values of surface coefficient of friction of the exterior surface of the sheath, for cables consisting of three individual large gauge AWG 4/0 THHN conductors, for varying percentages of the pulling lubricant, silicone oil, of varying molecular weights. The two lubricants compared in FIG. 3 are a high-molecular weight silicone oil (HMW Si) and a lower molecular weight silicone oil (LMW Si). Comparison results are shown for this same THHN cable arrangement lubricated with industry-standard Y77, as well as with respect to three other trial pulling lubricants, fluorinated oil, molydisulfide, and stearyl erucamide. The results in FIG. 3 illustrate that, while other pulling lubricants can reduce the coefficient of friction of the exterior surface of the cable, the preferred pulling lubricant for THHN cable, and particularly large gauge THHN cable, is a high molecular weight silicone oil added at a level of approximately 9%, by weight, or higher.

In accordance with an advantage of the present invention, the pulling lubricant that is incorporated in the sheath is present at the outer surface of the sheath when the cable engages, or in response to the cable's engagement with, the duct or other structure through which the cable is to be pulled. For the THHN cable of the present invention, where the outer sheath is of nylon and the preferred pulling lubricant is high molecular weight silicone oil, this silicon-based lubricant permeates the entire nylon sheath portion and is, in effect, continuously squeezed to the sheath surface in what is referred to as the "sponge effect," when the cable is pulled through the duct.

Compounding with Pulling Lubricant

As previously described, the pulling lubricant may be incorporated into the extruded sheath (or the outer layer of the cable sheath if the sheath is of multiple layers) by initially compounding the lubricant with the (outer) sheath material to be extruded. To prepare the lubricated blend of the present invention, the resin and additional components, including the pulling lubricant, are fed into any one of a number of commonly used compounding machines, such as a twin-screw compounding extruder, Buss kneader, Banbury mixer, two-roll mill, or other heated shear-type mixer. The melted, homogeneous blend is then extruded into strands or cut into strips that may be subsequently chopped into easily handled pellets. The so-prepared lubricated pellets are then fed into the extruder for forming the outer sheath.

THHN Cable

THHN and THWN-2 are types of insulated electrical conductors that cover a broad range of wire sizes and applications. THHN or THWN-2 conductors are typically 600 volt copper conductors with a sheath comprising an outer layer of nylon surrounding a layer of thermoplastic insulation and are heat, moisture, oil, and gasoline resistant. THHN cable is primarily used in conduit and cable trays for services, feeders, and branch circuits in commercial or industrial applications as specified in the National Electrical Code and is suitable for use in dry locations at temperatures not to exceed 90° C. Type THWN-2 cable is suitable for use in wet or dry locations at temperatures not to exceed 90° C. or not to exceed 75° C. when exposed to oil or coolant. Type THHN or THWN-2 conductors are usually annealed (soft) copper, insulated with a tough, heat and moisture resistant polyvinylchloride (PVC), over which a polyamide layer, specifically nylon, is applied. Many cables, including those addressed by the present invention, can be "multi-rated," simultaneously qualifying for rating as THHN or THWN-2.

Figure 6:
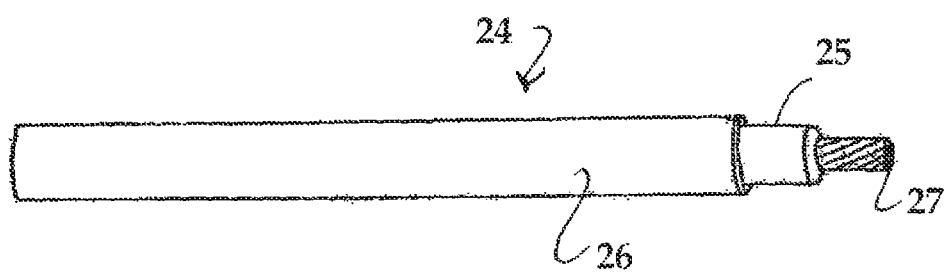
FIG. 6 is a section view of a THHN cable produced in accordance with the process of the present invention.

Referring now to FIG. 6, there is illustrated a THHN cable 24 constructed in accordance with the process of the invention. The cable is characterized by a sheath comprising an extruded layer 25 of PVC insulation material and an overlying extruded thin layer 26 of nylon, the sheath surrounding a central electric conductor 27 which is usually, though not exclusively, of copper. The only limitation on the type of pulling lubricant to be incorporated into the extruded outer nylon sheath is that it be sufficiently compatible with nylon to be co-processed with it, and particularly when compounded with nylon, that it be robust enough to withstand the high processing temperature for nylon, which is typically about 500° F. However, it has been found that for THHN cable, this lubricant is preferably a high molecular weight, high viscosity silicone fluid; for small gauge THHN wire, as an alternative, erucamide or stearyl erucamide.

Two industry-standard processes can be used to produce this product, the so called co-extrusion method and the tandem extrusion method. In both processes, the conductor, either solid or stranded, is first introduced into the extrusion head where the heated, melted PVC insulation compound is introduced and applied to the circumference of the conductor. In the co-extrusion process, the melted nylon compound is introduced into the same extrusion head and applied together with the PVC to the conductor, in a two-layer orientation. In the tandem process the PVC-coated conductor leaves the first extrusion head and is introduced into a second, separate extrusion head where the melted nylon is applied to the surface. In both cases, the final product is then introduced into a cooling water bath and ultimately the cooled product is wound onto reels. In either case, the nylon material is preferably initially compounded with the pulling lubricant to provide the so-lubricated extrusion pellets.

As shown in FIG. 2, small gauge THHN cable prepared, as described, with nylon as the outer layer of the sheath, and containing 0.25%, 0.50% and 0.85%, by weight, of stearyl erucamide, had an average pulling force of 18.1 lbs, 16 lbs and 18.5 lbs, respectively. Even better, small gauge THHN cable containing 0.25%, 0.50% and 0.85%, by weight, of erucamide had an average pulling force of 13.2 lbs, 10.3 lbs and 9.6 lbs, respectively. Comparably, the pulling force for a THHN cable with no pulling lubricant was measured at 38.5 lbs, and THHN cable with only Y 77 applied to the exterior surface was measured at 15.3 lbs. FIG. 3, on the other hand, illustrates the results when silicone oil is used in THHN cable, compared to other potential lubricants, illustrating silicone oil as a much preferred pulling lubricant for this type cable.

Although the aforementioned description references specific embodiments and processing techniques of the invention, it is to be understood that these are only illustrative. For example, although the description has been with respect to electrical cable, it is also applicable to other types of non-electrical cable such as, for example, fiber optic cable. Additional modifications may be made to the described embodiments and techniques without departing from the spirit and the scope of the invention as defined solely by the appended claims.

What is claimed is:

1. A method of manufacturing a thermoplastic high heat-resistant nylon-coated (THHN) electrical cable having a reduced installation pulling force through a conduit, the method comprising the steps of:
    advancing at least one conductor wire through an extrusion head;
    supplying polyvinyl chloride (PVC) polymer and extruding the PVC polymer around the conductor wire so as to form a PVC insulation layer surrounding the conductor;
    supplying nylon polymer to the extrusion head;
    supplying a silicone based pulling lubricant to the extrusion head;
    combining the nylon polymer and the silicone based pulling lubricant prior to extrusion to form an outer cable sheath layer material; and
    extruding the outer cable sheath layer material from the extrusion head and around the PVC insulation layer to form an outer sheath layer surrounding, contacting, and forming a coating around the PVC insulation layer, and wherein,
    combining the nylon polymer and the silicone based pulling lubricant further comprises combining the nylon polymer and the silicone based pulling lubricant in the outer cable sheath layer and forming an exterior surface for the THHN electrical cable that has a coefficient of friction against an interior surface of a conduit of less than about 0.25.

2. The method of claim 1, wherein the step of supplying the silicone based pulling lubricant further comprises supplying the silicone based pulling lubricant that is permeable through the nylon polymer of the formed outer cable sheath layer.

3. The method of claim 2, wherein the step of supplying the silicone-based pulling lubricant further comprises supplying the silicone based pulling lubricant that is permeable through the nylon polymer of the formed outer cable sheath layer and is squeezed therefrom when the THEN electrical cable is pulled through the conduit.

4. The method of claim 1, wherein the silicone based pulling lubricant consists essentially of low molecular weight silicone oil.

5. The method of claim 1, wherein the silicone based pulling lubricant consists essentially of high molecular weight silicone oil.

6. The method of claim 1, wherein the extruding step further comprises causing the nylon polymer and the silicone based pulling lubricant to reach at least about 500° F.

7. The method of claim 6, wherein the exterior surface of the THHN electrical cable has a coefficient of friction against the interior surface of the conduit of less than about 0.2.

8. The method of claim 6, wherein the exterior surface of the THHN electrical cable has a coefficient of friction against the interior surface of the conduit of between about 0.125 and about 0.2.

9. The method of claim 1, wherein the combining step comprises combining the nylon polymer and the silicone based pulling lubricant in relative amounts providing the concentration of between about 5% and about 9% by weight of the silicone based pulling lubricant in the formed outer cable sheath layer.

10. The method of claim 1, wherein the combining step comprises combining the nylon polymer and the silicone based pulling lubricant in relative amounts providing the concentration of between about 7% and about 9% by weight of the silicone based pulling lubricant in the formed outer cable sheath layer.

11. The method of claim 3, wherein the combining step comprises combining the nylon polymer and the silicone based pulling lubricant in relative amounts providing the concentration of between about 5% and about 6.5% by weight of the silicone based pulling lubricant in the formed outer cable sheath layer.

12. The method of claim 3, wherein the combining step comprises combining the nylon polymer and the silicone based pulling lubricant in relative amounts providing the concentration of about 4% by weight of the silicone based pulling lubricant in the formed outer cable sheath layer.

13. The method of claim 3, wherein the combining step comprises combining the nylon polymer and the silicone based pulling lubricant in relative amounts providing the concentration of about 5% by weight of the silicone based pulling lubricant in the formed outer cable sheath layer.

14. The method of claim 3, wherein the combining step comprises combining the nylon polymer and the silicone based pulling lubricant in relative amounts providing the concentration of about 6% by weight of the silicone based pulling lubricant in the formed outer cable sheath layer.

15. The method of claim 3, wherein the combining step comprises combining the nylon polymer and the silicone based pulling lubricant in relative amounts providing the concentration of about 7% by weight of the silicone based pulling lubricant in the formed outer cable sheath layer.

16. The method of claim 3, wherein the combining step comprises combining the nylon polymer and the silicone based pulling lubricant in relative amounts providing the concentration of about 8% by weight of the silicone based pulling lubricant in the formed outer cable sheath layer.

17. The method of claim 3, wherein the nylon polymer is a resin material containing the nylon polymer.

18. A THHN electrical cable manufactured according to the method of claim 1.

19. The method of claim 1, wherein the exterior surface of the THEN electrical cable has a coefficient of friction against the interior surface of the conduit of between about 0.132 and about 0.25.

20. The method of claim 1, wherein the conduit is defined as a PVC conduit including an initial 10 foot straight section of conduit, followed by a first 90° bend having a left-orientation, followed by a second 90° bend having a right orientation, followed by a 30 foot straight section of conduit, followed by a third 90° bend having a right-orientation, followed by a 5 foot straight section of conduit, followed by a fourth 90° bend having a right-orientation, followed by a 10 foot straight section of conduit.

21. An electrical power cable of a type comprising a conductor and a protective sheath surrounding said conductor, in which the protective sheath has an interior portion formed of a polyvinyl chloride polymer and at least an exterior portion surrounding, contacting, and forming a coating around the interior portion and formed of a layer of a nylon resin and a pulling lubricant comprising silicone introduced with the nylon resin during manufacture, the pulling lubricant to be available at an exterior surface of an electrical power cable when pulled through a conduit for reducing a required installation pulling force at the exterior surface of the electrical power cable for installation of the electrical power cable through the conduit, the electrical power cable having a characteristic that an average amount of force required to install said electrical power cable through an arrangement of the conduit is less than an average amount of force required to install a cable of a same cable type, shape and size having substantially no lubrication at an exterior surface of the cable of the same cable type, shape and size, through said arrangement of the conduit, the arrangement of the conduit being defined as a PVC conduit that is sized to accommodate said electrical power cable and an initial 10 foot straight section of conduit, followed by a first 90° bend having a left-orientation, followed by a second 90° bend having a right orientation, followed by a 30 foot straight section of conduit, followed by a third 90° bend having a right-orientation, followed by a 5 foot straight section of conduit, followed by a fourth 90° bend having a right-orientation, followed by a 10 foot straight section of conduit.

22. The electrical power cable of claim 21, wherein a cable coefficient of friction between the electrical power cable and the conduit is less than a coefficient of friction between a comparative cable, of a same type, shape and size manufactured without the pulling lubricant, and the conduit.

23. The electrical power cable of claim 21, wherein the pulling lubricant consists essentially of a low molecular weight silicone oil.

24. The electrical power cable of claim 21, wherein the pulling lubricant consists essentially of a high molecular weight silicone oil.

25. The electrical power cable of claim 21, wherein the pulling lubricant is a silicone oil in a concentration greater than about 5 wt.%, the silicone oil selected from only one of a high molecular weight silicone oil and a low molecular weight silicone oil.

* * * * *

UNITED STATES PATENT AND TRADEMARK OFFICE
CERTIFICATE OF CORRECTION

PATENT NO. : 10,763,008 B2  
APPLICATION NO. : 14/858872  
DATED : September 1, 2020  
INVENTOR(S) : Sasse et al.

Page 1 of 1

It is certified that error appears in the above-identified patent and that said Letters Patent is hereby corrected as shown below:

In the Claims

<u>Column 8</u>  
Line 1, Claim 3: "THEN" should read --THHN--

<u>Column 9</u>  
Line 2, Claim 19: "THEN" should read --THHN--

Signed and Sealed this  
Fifth Day of January, 2021

Andrei Iancu  
*Director of the United States Patent and Trademark Office*